US009145630B2

(12) United States Patent
McCoy et al.

(10) Patent No.: US 9,145,630 B2
(45) Date of Patent: Sep. 29, 2015

(54) RETRACTABLE QUILT CLAMP APPARATUS

(71) Applicant: Quilter's Gear, LLC, Terrell, TX (US)

(72) Inventors: Catherine Mae McCoy, Wills Point, TX (US); Richard Thomas McCoy, Wills Point, TX (US); Donna C. Watford, Terrell, TX (US)

(73) Assignee: Quilter's Gear, LLC, Terrell, TX (US)

( * ) Notice: Subject to any disclaimer, the term of this patent is extended or adjusted under 35 U.S.C. 154(b) by 0 days.

(21) Appl. No.: 14/145,828

(22) Filed: Dec. 31, 2013

(65) Prior Publication Data

US 2014/0190047 A1 Jul. 10, 2014

Related U.S. Application Data

(60) Provisional application No. 61/749,309, filed on Jan. 5, 2013.

(51) Int. Cl.
| | | |
|---|---|---|
| *D05B 39/00* | (2006.01) | |
| *A41H 15/00* | (2006.01) | |
| *D05B 91/06* | (2006.01) | |
| *D05B 11/00* | (2006.01) | |
| *G01B 3/02* | (2006.01) | |
| *G01B 3/10* | (2006.01) | |

(52) U.S. Cl.
CPC ............... *D05B 11/00* (2013.01); *A41H 15/00* (2013.01); *D05B 39/005* (2013.01); *D05B 91/06* (2013.01); *G01B 2003/103* (2013.01)

(58) Field of Classification Search
CPC ...... D05B 91/06; D05B 14/00; D05B 39/005; B65G 7/08; B60R 22/34; G01B 2003/103; G01B 3/02; A41H 15/00
USPC ................ 112/117–119, 103; 38/102, 102.1, 38/102.21, 102.91; 242/370, 371; 33/755
See application file for complete search history.

(56) References Cited

U.S. PATENT DOCUMENTS

| | | | |
|---|---|---|---|
| 263,487 A * | 8/1882 | Davis ............................ 112/119 |
| 303,854 A * | 8/1884 | Humphreys ............... 38/102.21 |
| 383,533 A * | 5/1888 | Ludwig ...................... 38/102.21 |
| 454,520 A | 6/1891 | Gibbs | |
| 672,809 A | 4/1901 | Russell | |
| 714,348 A | 11/1902 | Youngblood | |
| 1,050,948 A | 1/1913 | Jones | |
| 1,100,325 A | 6/1914 | Pronovost | |
| 1,212,516 A | 1/1917 | Lemons | |
| 1,237,974 A * | 8/1917 | Thomas ..................... 38/102.21 |
| 1,259,886 A | 3/1918 | McLeod | |
| 1,299,873 A | 4/1919 | Trueb | |
| 1,666,622 A | 8/1926 | Hess | |

(Continued)

*Primary Examiner* — Ismael Izaguirre
(74) *Attorney, Agent, or Firm* — Barry Dove

(57) ABSTRACT

A retractable quilt clamp apparatus is disclosed having a clamp attached to a strap, and a strap retraction mechanism attached to the strap. The strap retraction mechanism is configured to retract and retain at least part of the strap. The strap retraction mechanism includes a case, a spool, a spiral spring, and a brake. The case at least partially houses and retains the spool. The case and the spool retain the spiral spring. The strap is attached to the spiral spring, which biases the strap to be wound about the spool. The case includes a brake region for retaining and guiding movement of the brake. The brake is configured to press against the strap when in a locked position, and to allow clearance for the strap to move relative to the case when in an unlocked position. A bracket is used to attach the apparatus to a quilting frame, such as a quilting frame of a longarm quilting system.

21 Claims, 10 Drawing Sheets

(56) References Cited

U.S. PATENT DOCUMENTS

| | | | | |
|---|---|---|---|---|
| 1,675,609 | A | 9/1926 | Kelley | |
| 1,773,618 | A * | 8/1930 | Gearhart | 38/102.21 |
| 2,037,991 | A | 6/1934 | Mavity | |
| 2,076,704 | A | 3/1935 | Carlson | |
| 2,318,877 | A | 5/1943 | Meyer | |
| 2,536,766 | A | 12/1945 | Pechstein | |
| 2,456,225 | A * | 12/1948 | Thomas | 38/102.91 |
| 2,704,415 | A * | 3/1955 | Shiffman | 38/102.8 |
| 2,893,162 | A | 8/1955 | Knowles | |
| 3,041,004 | A | 7/1958 | Busch | |
| 3,044,426 | A | 3/1960 | Schwarzberger | |
| 3,098,280 | A | 7/1963 | Harris | |
| 3,141,628 | A | 7/1964 | Evans | |
| 3,164,907 | A | 1/1965 | Quenot | |
| 3,177,542 | A | 4/1965 | James | |
| 3,521,831 | A | 7/1970 | Schmidt | |
| 3,570,782 | A | 3/1971 | Hayes | |
| 3,767,092 | A | 10/1973 | Garrison | |
| 3,774,326 | A | 11/1973 | Selden | |
| 3,896,527 | A | 7/1975 | Miller | |
| 3,905,114 | A | 9/1975 | Rutty | |
| 3,960,095 | A | 6/1976 | Story | |
| 4,097,169 | A | 6/1978 | Kelly | |
| 4,131,244 | A | 12/1978 | Quenot | |
| 4,153,996 | A | 5/1979 | Rutty | |
| 4,192,241 | A | 3/1980 | Reed | |
| 4,194,703 | A | 3/1980 | Roe | |
| 4,262,613 | A | 4/1981 | Landoni | |
| 4,292,748 | A | 10/1981 | Miller | |
| 4,449,302 | A | 5/1984 | Drechsler | |
| 4,501,208 | A | 2/1985 | Landoni | |
| 4,534,089 | A | 8/1985 | Swan | |
| 4,663,854 | A | 5/1987 | Miller | |
| 4,665,638 | A | 5/1987 | Morton | |
| 4,702,184 | A | 10/1987 | Datlof | |
| 4,733,988 | A | 3/1988 | Kelly | |
| 4,763,390 | A | 8/1988 | Rooz | |
| 4,838,187 | A | 6/1989 | Tatum | |
| 4,893,423 | A | 1/1990 | Heinrich | |
| 4,972,601 | A | 11/1990 | Bickford | |
| 4,998,356 | A | 3/1991 | Chapin | |
| 5,007,178 | A | 4/1991 | Dewire | |
| 5,027,989 | A | 7/1991 | Nevius | |
| 5,046,222 | A | 9/1991 | Byers | |
| 5,211,362 | A | 5/1993 | Householder | |
| 5,226,250 | A | 7/1993 | Ulmer | |
| 5,245,715 | A | 9/1993 | Dinkins | |
| 5,388,313 | A | 2/1995 | Cameron | |
| 5,529,083 | A | 6/1996 | Martin | |
| 5,579,798 | A | 12/1996 | Pruitt | |
| 5,640,789 | A | 6/1997 | Spurgeon | |
| D386,215 | S | 11/1997 | White | |
| 5,711,098 | A | 1/1998 | Warne | |
| D405,808 | S | 2/1999 | Bankier | |
| 5,987,789 | A | 11/1999 | Lubina | |
| D420,800 | S | 2/2000 | Hicks | |
| D439,202 | S | 3/2001 | Takabayashi | |
| 6,223,665 | B1 | 5/2001 | Hindsley | |
| 6,446,567 | B2 | 9/2002 | Hindsley | |
| 6,516,500 | B2 | 2/2003 | Ogino | |
| 6,631,688 | B1 * | 10/2003 | Maag | 112/118 |
| 6,698,071 | B1 | 3/2004 | Greer | |
| 7,011,031 | B1 | 3/2006 | Bradley | |
| D528,903 | S | 9/2006 | Alitowski | |
| 7,152,284 | B1 | 12/2006 | Greer | |
| 7,185,402 | B2 | 3/2007 | Beltz | |
| 7,189,024 | B2 | 3/2007 | Cameron | |
| 7,243,402 | B2 | 7/2007 | Andersen | |
| 7,302,898 | B1 | 12/2007 | Martelli | |
| 7,308,739 | B2 | 12/2007 | Andersen | |
| 7,837,164 | B1 | 11/2010 | Getgood | |
| 7,871,052 | B2 | 1/2011 | Baum | |
| 7,996,963 | B2 | 8/2011 | Cameron | |
| D645,969 | S | 9/2011 | Del Solar | |
| 8,166,897 | B2 | 5/2012 | Bowers | |
| 8,196,272 | B2 | 6/2012 | Curtis | |
| 2005/0257353 | A1 * | 11/2005 | Rohrig | 24/537 |
| 2006/0150537 | A1 | 7/2006 | Baum | |
| 2009/0235497 | A1 | 9/2009 | Pontaoe | |

* cited by examiner

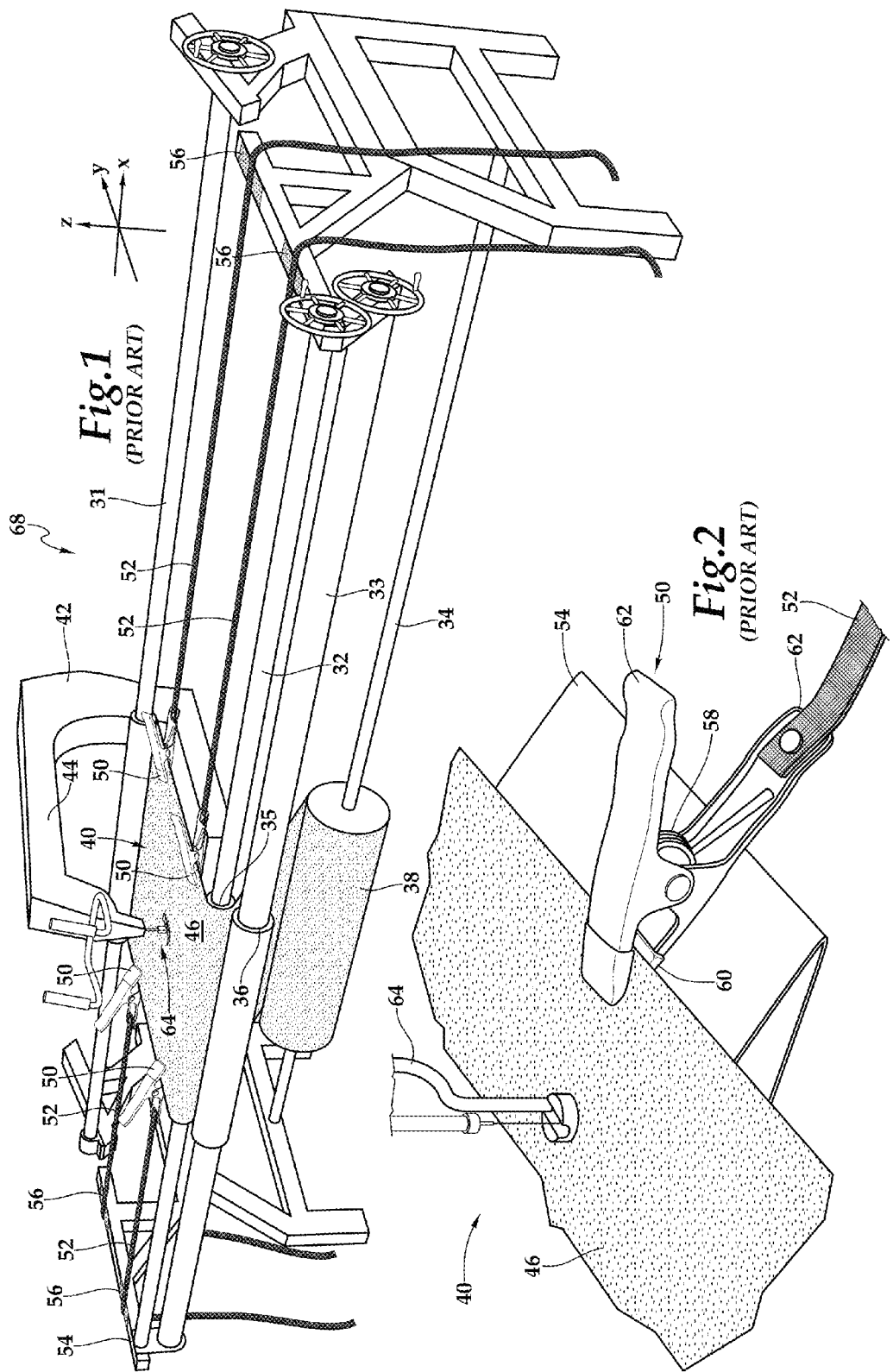

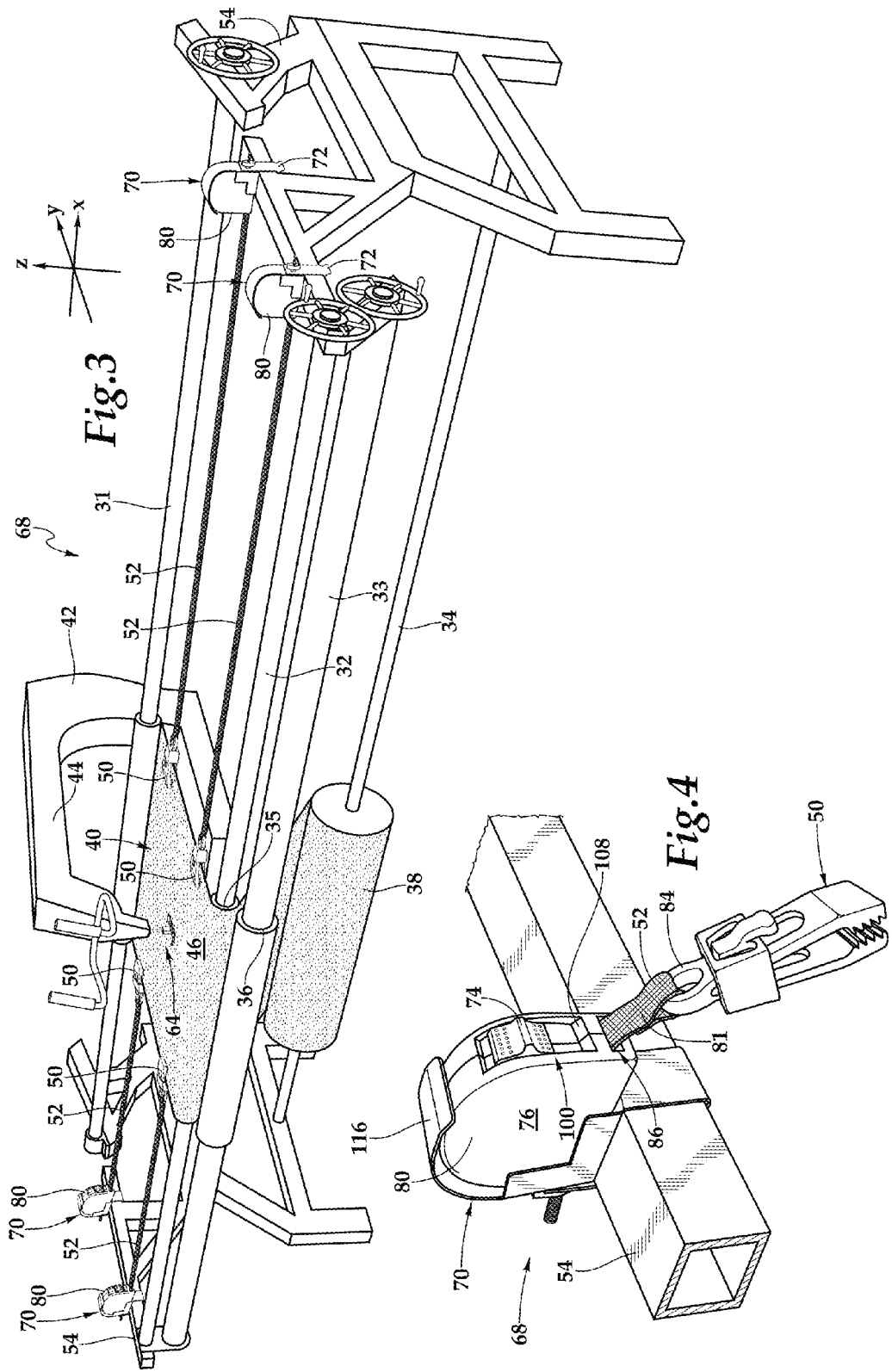

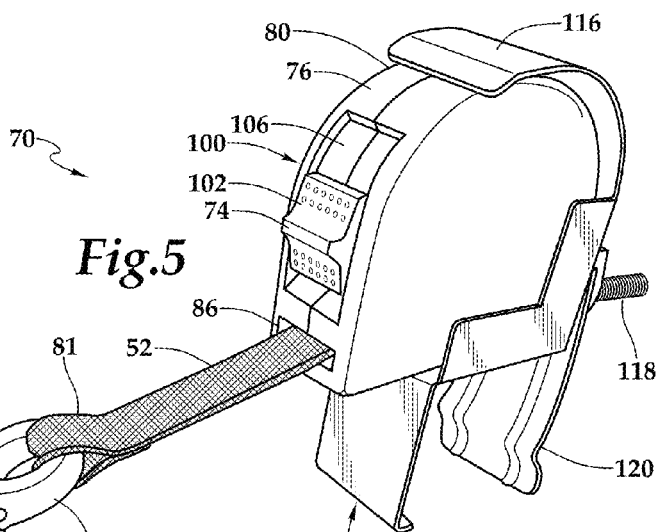
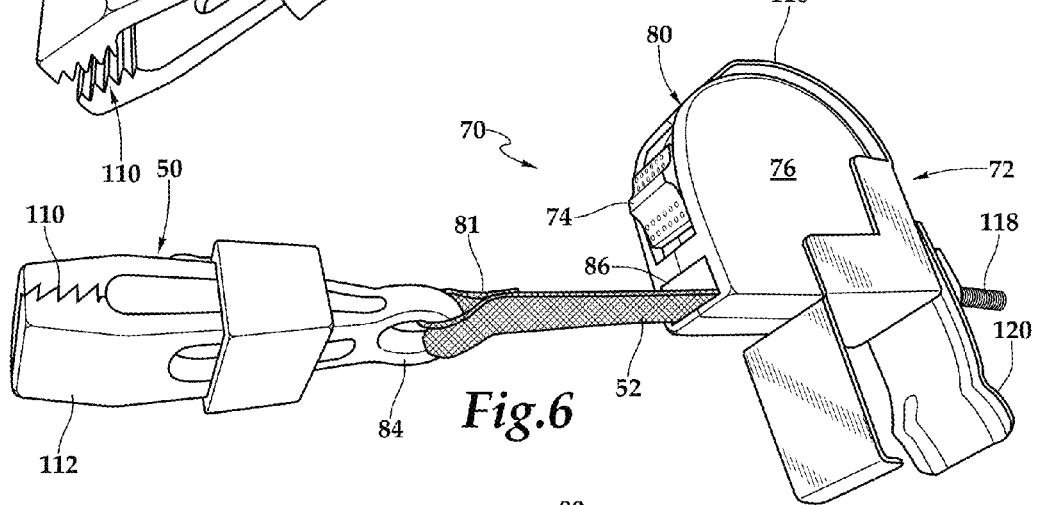
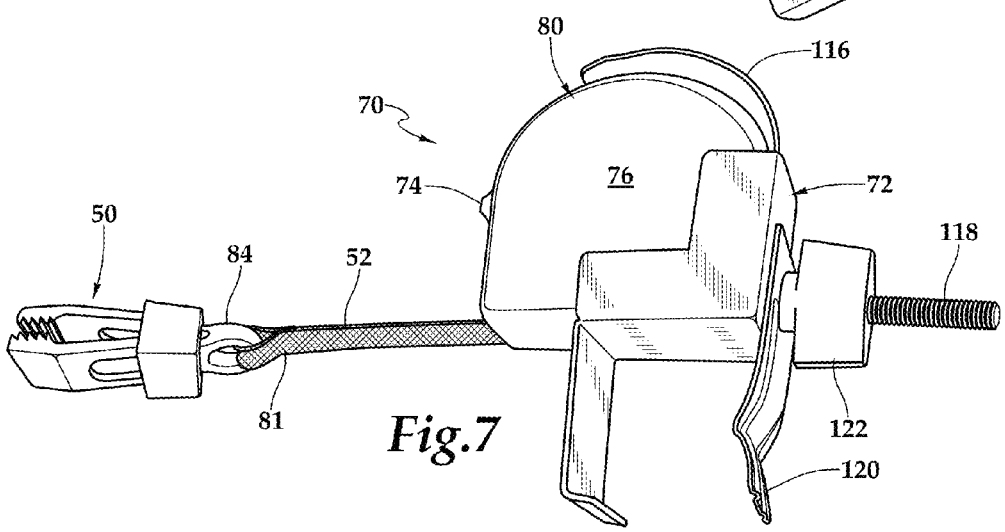

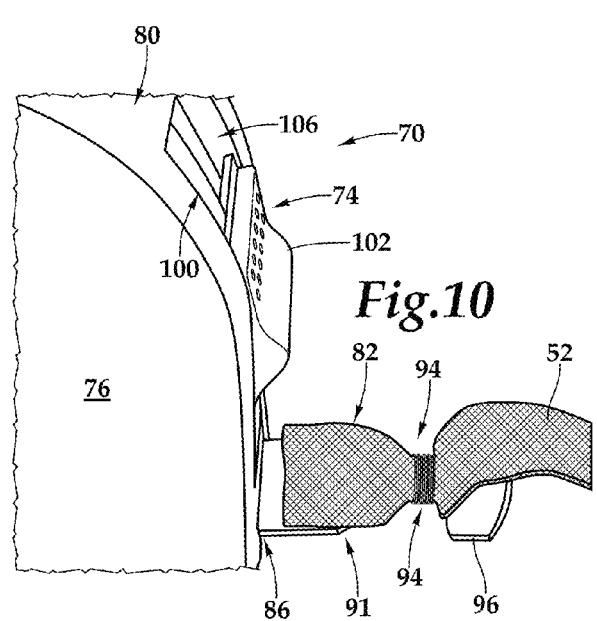
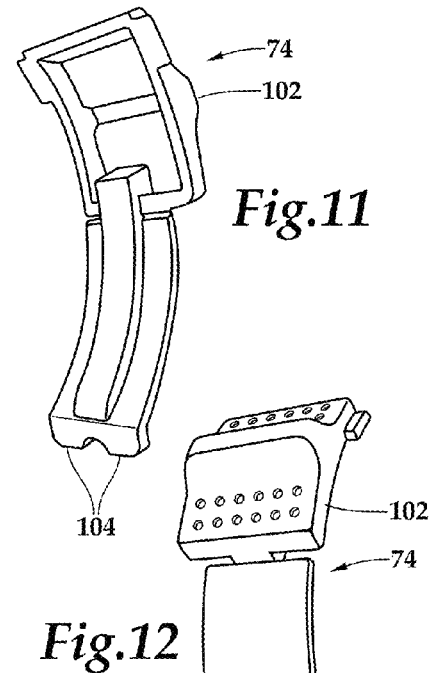
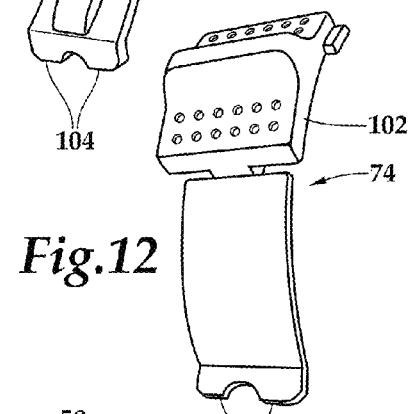
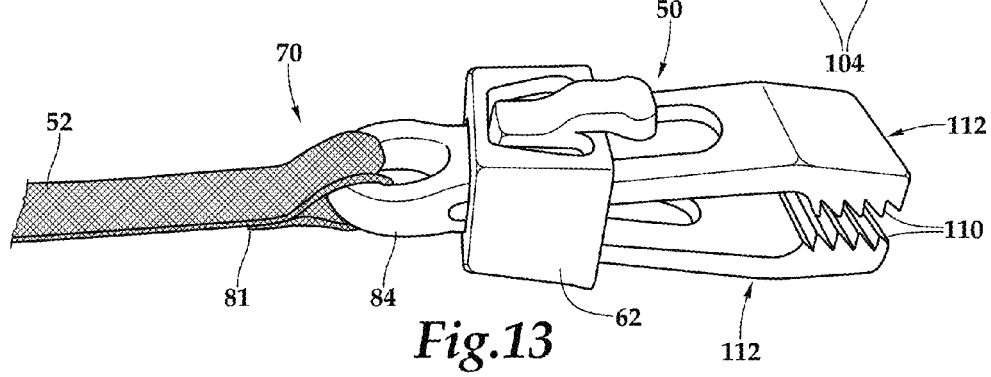
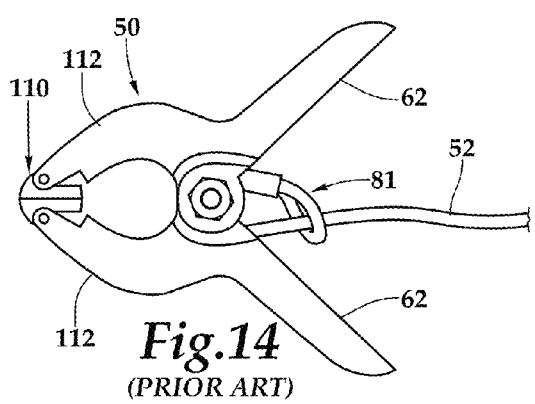
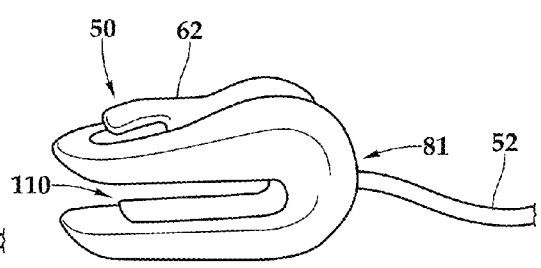

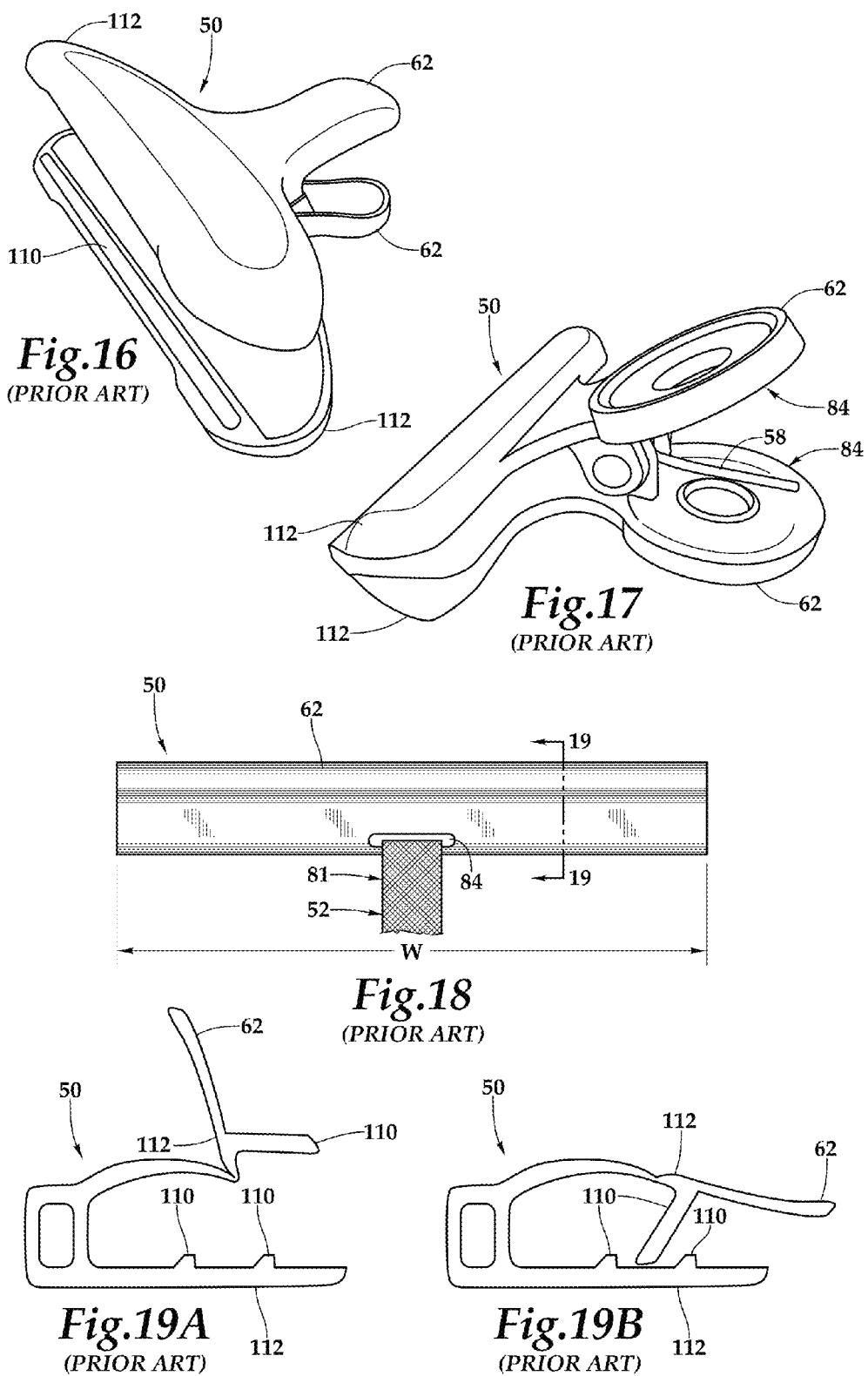

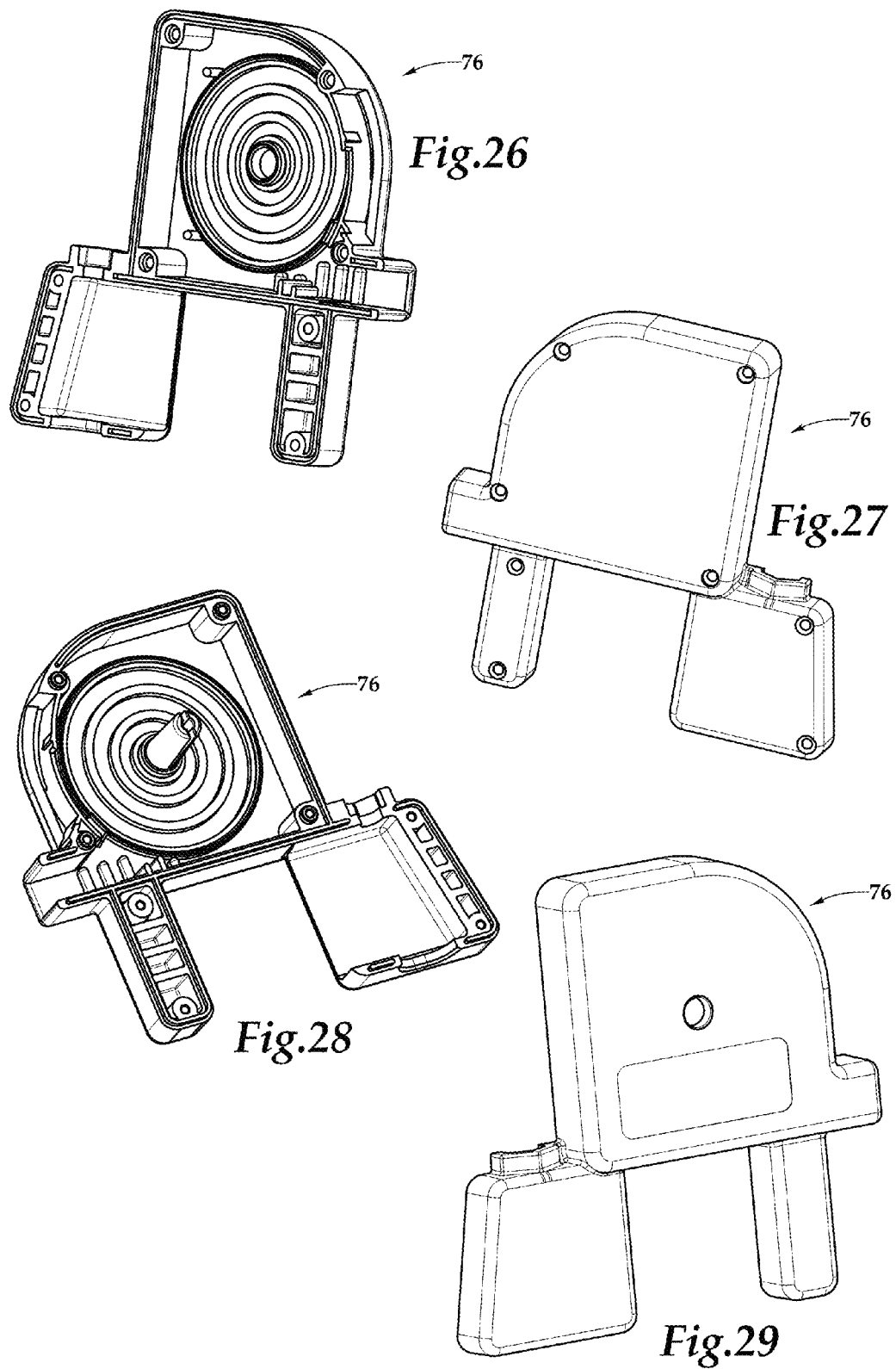

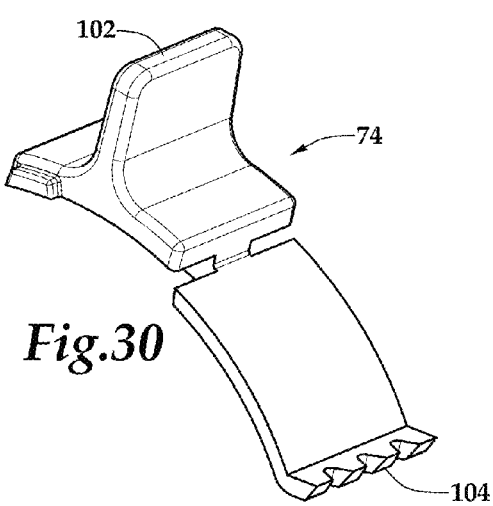
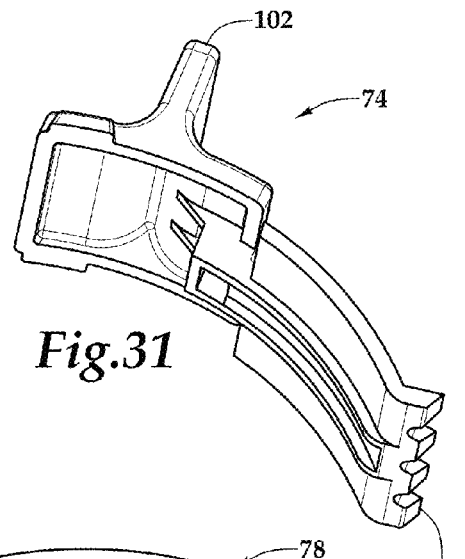
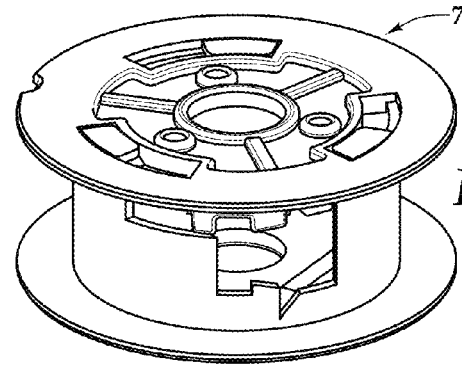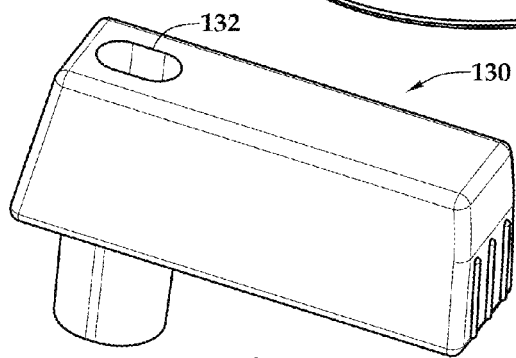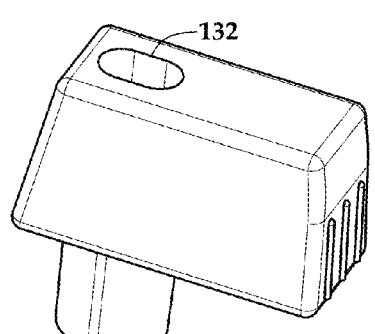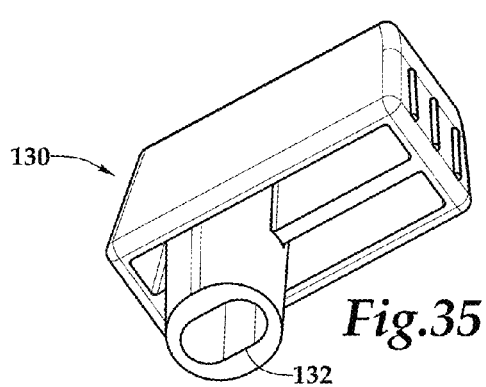

RETRACTABLE QUILT CLAMP APPARATUS

RELATED APPLICATION

This patent application claims benefit under 35 U.S.C. §119(e) of U.S. Provisional Patent Application 61/749,309, filed on Jan. 5, 2013, which is hereby incorporated by reference in its entirety.

TECHNICAL FIELD

The present disclosure relates to the field of quilting, and more particularly to the use of clamps and straps with a quilting frame to keep a quilt workpiece from sagging and moving laterally during quilting.

BACKGROUND INFORMATION AND DESCRIPTION OF THE RELATED ART

Quilting has been done for thousands of years in many cultures worldwide. The earliest known record of a quilt is shown in Egyptian artwork dating back to about 3400 B.C. The oldest existing quilt was found in Mongolia and dates back to about 100 B.C. Quilted materials have found many uses over the centuries, such as padded undergarments worn by knights under their armor, winter jackets, art tapestry for wall and floor coverings, padded/protective covers, and most commonly as artistic and/or functional blankets.

Generally, quilting may be described as the joining together of two or more layers of material by sewing to make a thicker padded/insulating material. Typically, a quilt includes three main layers: a bottom layer (or backing material), a top layer (or quilt top), and a batting or insulating material layer sandwiched between the bottom layer and the top layer. Needle and thread sewing in various patterns ties the three main layers together. Quilting may be used to prevent the batting material (e.g., goose feathers, wool) from bunching or gathering at one end of a comforter, for example, to maintain or control the distribution of the batting material across the comforter. Typically, the sewing is done in artist patterns (e.g., geometric shapes and fanciful patterns and sequences). Sometimes, artistic embroidery is incorporated into the sewing. Sometimes such embroidery patterns are preformed in the top layer before joining the three main layers, and thus only seen on the top side. And sometimes, the embroidery patterns are performed during the process of joining together the three main layers such that the same sewing pattern can be seen on both sides.

Quilting can be done by hand (with or without the use of a quilting frame), using a sewing machine (with or without the use of a quilting frame), or using a specifically designed longarm quilting system, for example. Indeed, some modern, sophisticated longarm quilting systems include computer aided design (CAD) and/or computer motion control of the sewing needle to create highly complex patterns and embroidery artwork, as well as highly repeatable and precise patterns. Quilting methods can range from as simple as a single person with a needle and thread, to a group of people working together with needle and thread on different portions together, to a simple wood frame securing the fabric layers and hung from a ceiling, to eight to fourteen foot metal framed longarm quilting systems with manual movement of a sewing machine on horizontal-plane rollers, to computer aided and/or computer controlled longarm quilting systems (e.g., Statler Stitcher® by Gammill®), to mass production industrial quilting machines.

FIG. 1 shows a longarm quilting system 30. In a typical longarm quilting system 30, there are three or more rollers (e.g., rollers 31, 32, 33, 34). A first roller 31 retains a first end of a backing material (bottom layer) 35, a first end of a quilt top material (top layer) 36, and a first end of a batting material (padded/insulating middle layer) 38. As the quilt is formed from a first quilt end to a second quilt end, the first quilt end is rolled onto and retained on the first roller 31. A second roller 32 retains a second end of the backing material 35. At the beginning of the quilt formation, most of the backing material 35 is rolled onto and retained on the second roller 32. As the backing material 35 is rolled onto the first roller 31, the backing material 35 is unrolled from the second roller 32. In the example in FIG. 1, the backing material 35 is in an S-shaped scroll configuration. A third roller 33 retains a second end of the quilt top material 36. At the beginning for the quilt formation, most of the quilt top material 36 is rolled onto and retained on the third roller 33. As the quilt top material 36 is rolled onto the first roller 31, the quilt top material 36 is unrolled from the third roller 33. The longarm quilting system 30 of FIG. 1 includes a fourth roller 34. The fourth roller 34 may be used to retain a second end of the batting material 38. At the beginning of the quilt formation, most of the batting material 38 is rolled onto and retained on the fourth roller 34. As the batting material 38 is rolled onto the first roller 31, the batting material 38 is unrolled from the fourth roller 34. The fourth roller may simply be a bar extending across the quilt frame (not pivotable) in some longarm quilting systems.

For the exemplary longarm quilting system 30 shown in FIG. 1, the workspace 40 where the sewing is done is located between the first and second rollers 31, 32. The sewing machine portion 42 of the system 30 has a long arm 44 that extends over the first roller 31 to allow for clearance of the rolled up material on the first roller 31. For a large workpiece 46, such as a queen-bed-size workpiece, when nearly completed and most of the workpiece 46 is rolled onto the first roller 31, the size of the rolled material may become quite large, which is why the sewing machine 42 has a large generally C-shaped structure extending about the first roller 31 to provide clearance for the material rolled onto the first roller 31.

Still referring to FIG. 1, at the workspace 40 where the sewing is done, the workpiece 46 is suspended between the rollers 31 and 32. During a preferred use of the system 30, the rollers are locked into their respective positions such that the workpiece 46 is suspended between the rollers without much, if any, sagging. Preferably, the rollers should be locked such that the workpiece 46 is within an optimal range of suspension tension; so that the workpiece 46 is not stretched too tightly in a way that would distort the Y-direction shape while also not being too loose in a way that would allow too much sagging of the workpiece 46 at the workspace 40. A reference Cartesian coordinate system orientation is shown in FIG. 1. The rollers typically provide sufficient tension in the Y direction to prevent too much sagging. But in the X direction, there is need for support, especially when the workpiece 46 is large and/or heavy (which may be dependent on the thickness and composition of the materials used for the various layers).

As shown in FIGS. 1 and 2, a current practice is the use of clamps 50 and straps 52 to provide an X-direction tension on the workpiece 46. As with the suspension tension discussed above for the Y direction, it is desired to retain the workpiece 46 within an optimal range of suspension tension in the X direction so that the workpiece 46 is not stretched too tightly in a way that would distort the X-direction shape while also not being too loose in a way that would allow too much sagging of the workpiece 46 (especially at the lateral edges not supported by the rollers).

In FIG. 1, the system utilizes four clamps 50. There may be any number of clamps used (including none at all) when using a longarm quilting system 30. Generally, the larger the quilting frame 54, the wider the workpiece 46, and/or the larger the distance between the rollers 31 and 32 (i.e., the larger the workspace 40 for sewing), the more clamps 50 are desired or needed, especially while sewing at or near the lateral edges. Next, the use and disadvantages of this clamp and strap configuration shown in FIGS. 1 and 2 will be described.

The clamps 50 of FIG. 1 are shown attached to the lateral edges of the workpiece 40. A strap 52 is attached to the handle of each clamp 50, and extends from the clamp handle to the quilt frame 54. Most currently used straps 52 include a hook-and-loop type fastener material (also commonly known by the trademark Velcro). Strips or pieces 56 of hook/loop fastener material are attached to the quilt frame 54. Hook/loop fastener material on the strap 52 is adapted for engaging with and sticking to the hook/loop fastener material 56 on the quilting frame 54.

FIG. 2 is a closer view of one clamp and strap configuration of FIG. 1. The clamp 50 of FIG. 2 is a clamp type that is supplied with or as an accessory for some longarm quilting systems 30. The clamp 50 of FIG. 2 is a squeeze type clamp made from metal, with a heavy spring 58 and silicon covered tips 60. A strap 52 is bolted to the handle 62 of the clamp 50.

Now, usage of the clamp and strap configuration shown in FIGS. 1 and 2 will be described. After arranging the quilting materials 35, 36, and 38 with a desired Y-direction tension using the rollers 31, 32, 33, and 34 (as described above), one of the clamps 50 is attached to the lateral edge of the workpiece 46 (typically the backing material 35), as shown in FIG. 2. There may be a preferred order of placement, but generally the order of placement of four clamps 50 shown in FIG. 1 is not critical to usage (i.e., selecting which of the four clamps 50 to position first). The user then extends the strap 52 from the clamp 50 towards the quilting frame 54 generally along the X direction. The strap 52 is pulled gently by the user to apply a desired amount of lateral (X-direction) tension on the workpiece 46 (to reduce or avoid sagging). Then the user engages the hook/loop fastener of the strap 52 with the loop/hook fastener strip or piece 56 on the quilting frame 54 while maintaining the desired tension on the strap 52. The hook and loop fastener formed thereby is then used to retain the position and tension on the strap 52, which is translated to the workpiece 46 via the clamp 50.

When the user desires or needs to move the workpiece 46 to change the portion of the workpiece 46 located in the workspace 40 (e.g., to roll the completed or partially completed workpiece portion on the first roller 31 from the workspace 40), the clamps 50 are typically removed first before rolling the materials. Typical usage of the clamp and strap configuration shown in FIGS. 1 and 2, may include the following steps for removal. The user disengages the hook-and-loop fastener for a selected strap 52 (by pulling the strap 52 away from the quilt frame 54). Then, the user squeezes the clamp 50 to release its grip on the workpiece 46 and removes the clamp 50 from the workpiece 46. Alternatively, the clamp 50 may be removed while leaving the straps 52 in place attached to the quilt frame 54 by the hook-and-loop fastener. Or, the strap 52 may be removed or repositioned after removing the clamp 50.

Now at this point during use of the clamp and strap configuration of FIGS. 1 and 2, disadvantages and discomforts of using this configuration reveal themselves. If the clamp spring 58 has a relatively large spring constant for a given user, the user may need to use two hands to squeeze and remove the clamp 50. The majority of quilters are women, and of them, the majority of them are over fifty years old. Thus, a clamp 50 that requires a woman to use two hands to squeeze it is undesirable to many users. At this point, the strap 52 is probably dragging on the floor. Also, when the strap 52 was engaged on the quilting frame 54, an end of it may extend to the floor as well (such as when a workpiece 46 is wide relative to the quilting frame 54), as shown in FIG. 1. A hook/loop fastener has a tendency to grab and retain dust, fabric fuzz (especially batting material), hair, rug material, carpet material, food particles, debris, and other loose materials typically found on a floor. As a result of the hook/loop fastener regularly touching the floor during use, the strap 52 and/or the hook/loop material 56 on the quilting frame 54, tends to become not only less visually attractive (sometimes downright gross over time), but also less functional. The strength of a hook-and-loop fastener when engaged greatly depends on the hook-and-loop fastener being free from debris that can obstruct a hook from engaging a loop to form the fastener. Many users strive to keep their hook-and-loop fasteners clean by trying to prevent the strap 52 from touching the floor. For example, some users try to hold the strap 52 with one hand while manipulating the clamp 50 with the other hand (one-handed clamp operation), but some users are unable to do this due to strength and/or coordination limitations. For example, some users try to roll up or ball up the strap 52 before releasing the clamp 50 and securing the roll/ball of strap with a rubber band. This is very time consuming and annoying to many users. Some users tend to replace the straps or the entire clamp and strap combination regularly because the straps become dirty, unsightly, and/or non-functional, which can become expensive over time.

Another issue is where to put the clamp 50 after removing it from the workpiece 46. Some users clamp it to the quilting frame 54, but many quilting frames are not conducive to allowing the clamp to be attached (e.g., when the quilting frame is larger than the maximum bit opening size of the clamp). Many user do not bother with winding up the strap 52 (to keep it from touching the floor) and use the hook-and-loop fastener on the strap 52 to attach the clamp 50 to the quilting frame out of the way. This leads to a large portion of the strap 52 laying on the floor to collect debris. Furthermore, a strap 52 hanging down onto the floor during use can create a trip hazard, such as when one end of the quilting frame is at or close to a walkway or doorway. Few users have enough extra space in their studio to prevent an end of the quilting frame from being at or near a walkway or doorway. Hence, the use of straps that rely on hook-on-loop fasteners may have many disadvantages that are undesirable to many users.

One of the disadvantages of heavy clamps (e.g., those made from metal and those that are large) is that the weight of the clamp itself may induce sagging of the workpiece 46, which is typically undesirable. A disadvantage for some clamps, in the viewpoint of some quilters, is that the clamp is too hard to squeeze for the typical quilter or too complicated to lock and unlock, thereby requiring two hands to operate the clamp itself A disadvantage of some clamps is that they are too bulky or too large in the Z direction relative to the X-Y plane. For example, the clamp 50 shown in FIGS. 1 and 2 is particularly large in the Z direction relative to other possible clamp options. This can cause problems for the user when trying to sew at or near the lateral edge because the sewing machine can bump or hit the clamp 50 causing the workpiece to move and/or the clamp 50 can prevent the sewing head 64 from reaching the full extent in the X direction desired or needed during sewing. Often the bottom of the sewing machine 42 will collide with the bottom of the clamp 50 without the user seeing the forthcoming collision because the larger bottom portion of the sewing machine is not visible under the backing material 35 during use (see e.g., FIG. 2). Such collisions can cause an intended sewing path to be hindered and altered, often requiring the user to stop, remove threads, and reset the sewing head (which may be very difficult and time consuming, as well as frustrating and discouraging). Many times the backing material layer 35 is not selected to be sufficiently wider than the quilt top layer 36 to allow for enough space and clearance of a large and bulky clamp 50. Often customers send to quilters a partially completed quilt (e.g., designs and patterns stitched, embroidered, or formed in a quilt top but not yet formed with the other layers to make a quilt) which does not have a large enough backing material layer because they do not have experience or knowledge of the need for larger backing material for longarm quilting systems. Hence, in the opinion of many users, there are many disadvantages and undesirable aspects of currently available clamps and clamp/strap combinations for use with quilting frames and/or longarm quilting systems.

BRIEF SUMMARY

An embodiment of the invention is briefly summarized in this paragraph. A retractable quilt clamp apparatus includes a clamp attached to a strap, and a strap refraction mechanism attached to the strap. The strap retraction mechanism is configured to retract and retain at least part of the strap. The strap retraction mechanism includes a case, a spool, a spiral spring, and a brake. The case at least partially houses and retains the spool. The case and the spool retain the spiral spring. The strap is attached to the spiral spring, which biases the strap to be wound about the spool. The case includes a brake region for retaining and guiding movement of the brake. The brake is configured to press against the strap when in a locked position, and to allow clearance for the strap to move relative to the case when in an unlocked position. A bracket is used to attach the apparatus to a quilting frame, such as a quilting frame of a longarm quilting system.

An embodiment of the invention is briefly summarized in this paragraph. A quilt clamp apparatus includes a clamp, a strap, and a strap retraction mechanism. The clamp has jaws configured for holding a sheet during use of the apparatus, such as retaining a sheet on a longarm quilting system for example. The strap has a first strap end and a second strap end. The first strap end is attached to the clamp. The strap retraction mechanism is attached to the second strap end. The strap retraction mechanism is configured to retract and retain at least part of the strap during use.

More specific aspects of example embodiments are briefly summarized in this paragraph. The strap retraction mechanism includes a case, a spool, a spiral spring, and a brake. The case at least partially houses and retains the spool. The spiral spring has a first spring end and a second spring end. The second strap end is attached to the first spring end. The second spring end is retained within an inner region of the spool. The inner region of the spool at least partially houses and retains the spiral spring. At least part of the strap is wound about an outer region of the spool when at least part of the strap is retracted into the case. The case includes a brake region for retaining and guiding movement of the brake. The brake is configured to press against the strap when in a locked position and to allow clearance for the strap to move relative to the case when in an unlocked position. The brake may include a brake knob extending at least partially outside of the case. At least part of the brake may be a slider mechanism, for example. A bracket is attached to the strap retraction mechanism. At least part of the bracket may be an integral part of at least one portion of the case. At least part of the bracket may be separable from the case. The bracket may be adjustable. The bracket may be specifically designed for attaching to a particular make and model of quilting frame. The bracket may include a threaded shaft and a nut. For ease of use and saving time, the nut may include an outer surface configured for tightening and loosening the nut by hand without the need for tools. The clamp may include a spring biasing the jaws toward a closed position. The clamp jaws may include a first material forming a structural shape of the clamp and a second material forming one or more teeth members. The second material may be more compliant than the first material. At least part of the strap may include an elastic band material.

An embodiment of the invention is briefly summarized in this paragraph. A quilt clamp apparatus includes a clamp, a strap, a strap retraction mechanism, and an adjustable bracket. The clamp is configured for grabbing and releasably holding a sheet during use of the apparatus. The strap includes a first strap end and a second strap end. The first strap end is attached to the clamp. The strap retraction mechanism includes a case, a spool, a spiral spring, and a brake. The case includes a first case half attached to a second case half. The case at least partially houses and retains the spool. The first case half has a central case post extending therefrom and at least partially within the spool. The central case post has a slit formed therein. The spiral spring has a first spring end and a second spring end. The second strap end is attached to the first spring end. The second spring end extends at least partially through the slit of the central case post to retain the second spring end. The spool has an inner drum region at least partially housing and retaining the spiral spring. At least part of the strap is wound about an outer region of the spool when at least part of the strap is retracted into the case. The case includes a brake region for retaining and guiding movement of the brake. The brake is configured to press against the strap when in a locked position and being configured to allow clearance for the strap to move in and out of the case when in an unlocked position. An adjustable bracket is attached to the strap retraction mechanism. The bracket is configured for attachment to a quilting frame during use of the apparatus.

An embodiment of the invention is briefly summarized in this paragraph. A quilting system includes a quilting frame and a quilt clamp apparatus configured to attach to the quilting frame. The quilt clamp apparatus includes a clamp, a strap, a strap retraction mechanism, and a bracket. The clamp has jaws configured for holding a sheet during use. The strap has a first strap end and a second strap end. The first strap end is attached to the clamp. The strap retraction mechanism is attached to the second strap end. The strap retraction mechanism is configured to retract and retain at least part of the strap during use. The bracket is attached to the strap retraction mechanism. The bracket is configured for attaching the strap retraction mechanism to the quilting frame. The quilting system may include a sewing machine movably coupled to the quilting frame, such as a longarm quilting system for example.

BRIEF DESCRIPTION OF THE DRAWINGS

The following is a brief description of the drawings, which illustrate exemplary embodiments of the present invention and in which:

FIG. 1 is a perspective view of a longarm quilting system;

FIG. 2 is a close up perspective view of one clamp and strap configuration of FIG. 1;

FIG. 3 is a perspective view of a longarm quilting system embodiment of the invention;

FIG. 4 is a close up perspective view of one retractable quilt clamp apparatus of FIG. 3;

FIG. 5 is a perspective view of a quilt clamp apparatus of FIG. 3, removed from the quilting frame;

FIG. 6 is a perspective view of a quilt clamp apparatus of FIG. 3, removed from the quilting frame;

FIG. 7 is a perspective view of a quilt clamp apparatus of FIG. 3, removed from the quilting frame;

FIG. 10 is a side perspective view of a quilt clamp apparatus of FIG. 3, removed from the quilting frame, with the strap fully extended out of and fully outside of the casing;

FIG. 11 is a rear perspective view of a brake from a quilt clamp apparatus of FIG. 3;

FIG. 12 is a front perspective view of a brake from a quilt clamp apparatus of FIG. 3;

FIG. 13 is a close up perspective view of a clamp and a first strap end of a quilt clamp apparatus of FIG. 3;

FIG. 14 is a perspective view of a clamp and a strap;

FIG. 15 is a perspective view of a clamp and a strap;

FIG. 16 is a perspective view of a clamp;

FIG. 17 is a perspective view of a clamp;

FIG. 18 is a top view of a clamp and a strap;

FIG. 19A is a cross-section view of the clamp of FIG. 18 in an open position, as taken along line 19-19;

FIG. 19B is a cross-section view of the clamp of FIG. 18 in a closed position, as taken along line 19-19;

FIGS. 26 and 27 are perspective views of the left half of the case for the retractable clamp apparatus of FIGS. 24 and 25;

FIGS. 28 and 29 are perspective views of the right half of the case for the retractable clamp apparatus of FIGS. 24 and 25;

FIG. 30 is a front perspective view of a brake from the retractable clamp apparatus of FIGS. 24 and 25;

FIG. 31 is a rear perspective view of a brake from the retractable clamp apparatus of FIGS. 24 and 25;

FIG. 32 is a perspective view of a spool from the retractable clamp apparatus of FIGS. 24 and 25;

FIG. 33 is a top perspective view of a bracket member for the retractable clamp apparatus of FIGS. 24 and 25, adapted for use with 5/8 inch square frame tubing;

FIG. 34 is a top perspective view of a bracket member for the retractable clamp apparatus of FIGS. 24 and 25, adapted for use with 1.5 inch square frame tubing; and FIG. 35 is a bottom perspective view of a bracket member for the retractable clamp apparatus of FIGS. 24 and 25, adapted for use with 1.5 inch square frame tubing.

DETAILED DESCRIPTION OF ILLUSTRATIVE EMBODIMENTS

Figure 8:
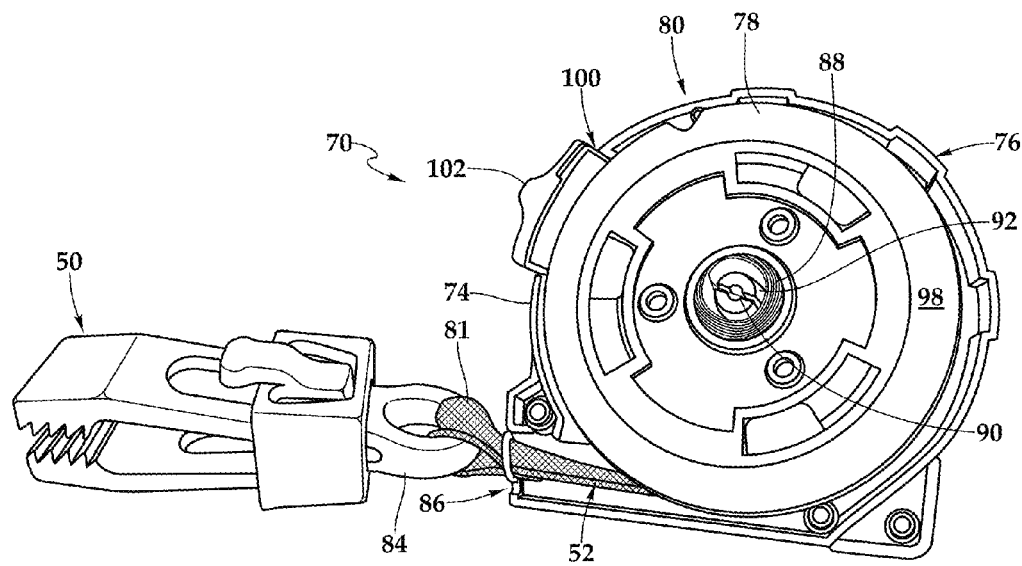
FIG. 8 is a side perspective view of a quilt clamp apparatus of FIG. 3, removed from the quilting frame, with a portion of a case removed to reveal internal parts of the apparatus.

Referring now to the drawings, wherein like reference numbers are used herein to designate like or similar elements throughout the various views, illustrative embodiments of the invention are shown and described. The figures are not necessarily drawn to scale, and in some instances the drawings have been exaggerated and/or simplified in places for illustrative purposes only. One of ordinary skill in the art will appreciate the many possible applications and variations of the invention in light of this disclosure of the following illustrative embodiments of the invention. The problems and needs outlined above may be addressed by embodiments of the invention.

FIG. 3 shows a longarm quilting system embodiment 68 of the invention, incorporating retractable quilt clamp apparatus embodiments 70 of the invention. A reference Cartesian coordinate system orientation is shown in FIG. 3. There are many configurations and designs for longarm quilting systems, that are currently known, and perhaps more will be later developed, feature combinations and aspects of which may be incorporated into other embodiments of the invention. For example, the following US patents regarding quilting systems and other cloth/sheet related systems (embroidery systems, curtain making systems) are hereby incorporated by reference: U.S. Pat. Nos. 454,520, 672,809, 1,212,516, 1,299,873, 1,666,622, 1,675,609, 2,037,991, 2,318,877, 2,893,162, 3,044,426, 3,098,280, 3,774,326, 3,960,095, 4,192,241, 4,262,613, 4,292,748, 4,501,208, 4,665,638, 4,702,184, 4,838,187, 4,893,423, 5,027,989, 5,211,362, 5,226,250, 5,640,789, 5,711,098, 5,987,789, 7,011,031, and 8,166,897. A quilting system of an embodiment may include a computer system and a flat panel display, for example. A quilting system of an embodiment may include a touch sensitive controls, a touch sensor screen, or combinations thereof, for example. Next, the details of the quilt clamp apparatus 70 of the embodiment shown in FIG. 3 will be described in more detail with reference to FIGS. 4-13 and 20-22.

Generally, the quilt clamp apparatus 70 of the illustrative embodiment of FIGS. 3-13 and 20-22 provides a way to keep a workpiece 46 (e.g., quilt layers) from sagging and moving laterally during quilting, by providing support at lateral edges of the workpiece 46 that are not supported by the rollers 31, 32, and 33 of the quilting frame 54. Generally, the rollers 31, 32, and 33 of the quilting frame 54 provide support in the X, Y, and Z directions, but primarily in the Y direction and less in the X and Z directions at locations of the workpiece 46 that are a spaced distance from the rollers. In FIG. 3, the quilt clamp apparatus 70 is providing additional support of the workpiece 46 primarily in the X direction, but also in the Z direction, at locations that are a spaced distance from the rollers 31, 32, and 33. One thing to note in this embodiment is the lack of need for hook and loop fasteners to retain the strap 52 at the quilting frame 54. Instead, the quilt clamp apparatus 70 of this embodiment uses a bracket 72 and a brake mechanism, which will be described below.

Figure 9:
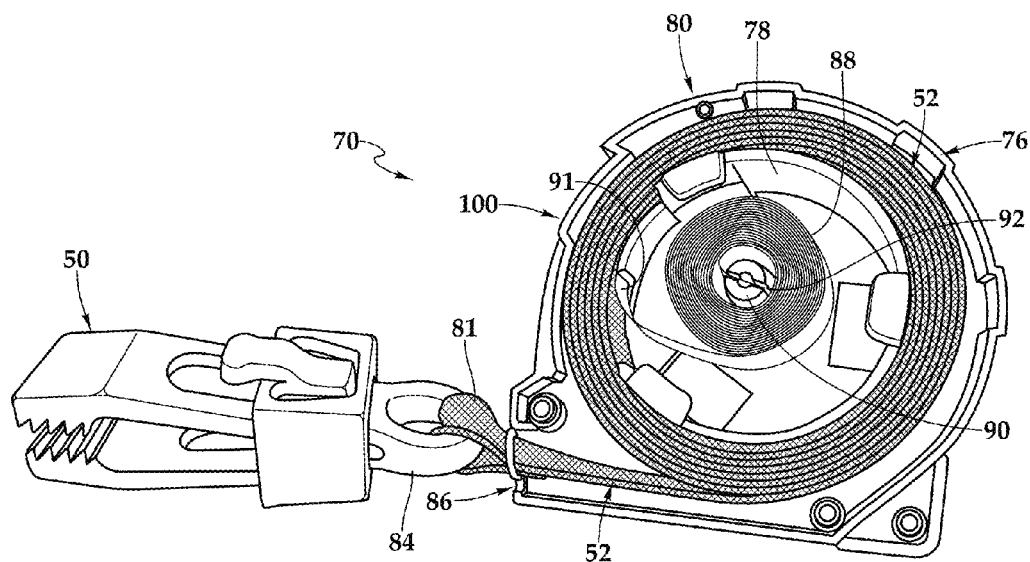
FIG. 9 is a side perspective view of a quilt clamp apparatus of FIG. 3, removed from the quilting frame, with a portion of a case removed and a portion of a spool removed to reveal internal parts of the apparatus.

FIG. 4 shows a close-up view of a quilt clamp apparatus 70 attached to a quilting frame 54 of a longarm quilting system 68. In FIG. 4, the apparatus 70 is shown with the strap 52 retracted into the apparatus 70 such that the clamp 50 is retained while not being used to clamp onto the workpiece 46 (e.g., when moving the workpiece 46 on the quilting frame 54). Also note that in FIG. 4, the brake 74 is in an unlocked position (the brake 74 will be discussed further below). FIGS. 5-7 show various perspective views of the quilt clamp apparatus 70 removed from the quilting frame 54. FIGS. 8 and 9 show a portion of a case 76 removed from the quilt clamp apparatus 70 to reveal internal parts of the apparatus 70. FIG. 9 also shows a portion of a spool 78 removed to further reveal internal parts of the apparatus 70. FIG. 10 shows the apparatus 70 with the strap 52 fully extended out of and fully outside of the case 76.

Referring now to FIGS. 3-10, the quilt clamp apparatus 70 of the illustrative embodiment includes a clamp 50, a strap 52, a strap retraction mechanism 80, and an adjustable bracket 72. The clamp 50 is configured for grabbing and releasably holding a sheet, such as a backing material layer 35 of a quilt, during use of the apparatus 70. The strap 52 has a first strap end 81 and a second strap end 82. The first strap end 81 is attached to the clamp 50. The clamp 50 has a loop 84 for attaching the first strap end 81. During making the apparatus 70, the first strap end 81 is threaded through the loop 84 and back upon itself. Then, the first strap end 81 is sewn to the strap 52 to secure the first strap end 81. In other embodiments, the first strap end 81 may be attached to the clamp 50 in any of a wide variety of ways, including but not necessarily limited to a snap, a hook and loop fastener, a rivet, a staple, a crimped metal band, a clamp, a button, adhesive, ultrasonic welding, welding, soldering, melting, bolt/nut combo, screw, a releasable clip, metal wire, or any combination thereof, for example. The apparatus 70 may be sold or packaged without a clamp 50 for allowing a user to attach his/her choice of clamp. The clamp 50 may be removable from the first strap end 81 (with or without tools) to allow the user to change the clamp. The apparatus 70 may be sold with a variety of clamps, allowing the user to interchange clamps as desired/needed for different applications and uses of the apparatus.

The strap 52 of this illustrative embodiment is made from a seven foot long, ¾ inch wide polypropylene webbing material, a flat webbing material. The length of the strap 52 was selected to be seven feet long because most all longarm quilting systems are less than fourteen feet wide. Thus, two apparatus 70 used, one on each side, will reach to the middle of most all quilting frames for currently offered longarm quilting systems. Of course, other lengths may be used in other embodiments. The width of the strap 52 was selected to fit within the case opening 86 and on the spool 78 of the apparatus 70. The width of the spool 78, case opening 86, and strap 52 may vary for other embodiments. The strap 52 may be made from one or more materials, including but not necessarily limited to nylon, polyester, polypropylene, carbon fiber, aramid fiber, synthetic fiber, natural fiber, leather, cotton, silk, hemp, linen, metal, steel, titanium, copper, aluminum, silicon, and vinyl or any combination thereof, for example. For example, the strap of an embodiment may be made from a steel cable with a vinyl coating. For example, the strap of an embodiment may be made from monofilament line made from a synthetic fiber, such as heavy fishing line material. The strap of an embodiment may include an elastic band portion to provide greater tension on the sheet during use. In an embodiment, the elastic band portion may be located at or near the first strap end of the strap (at or near where the strap attaches to the clamp). In another embodiment, the entirety of the strap may be made from an elastic band type material so that the strap can be stretched to a desired tension prior to or after locking the brake mechanism to hold the strap in place.

Still referring to FIGS. 3-10, the strap retraction mechanism 80 of the example embodiment includes a case 76, a spool 78, a spiral string 88, and a brake 74. The case 76 has a first case half attached to a second case half by a set of screws extending through the second case half into holes formed in the first case half. The first case half has a central post 90 extending therefrom and integrally formed as part of the first case half. The central post 90 has a slit formed therein (see FIGS. 8 and 9). The central post 90 extends into and through the center of the spool 78. The case 76 is made of molded plastic. But in other embodiments, the case 76 may be made of any suitable material, including but not necessarily limited to plastic, rubber, wood, metal, polymer, fiberglass, fiber reinforced polymer, carbon fiber composite material, fiber reinforced composite material, glass, acrylic, thermoplastic material, or any combination thereof, for example. The case 76 in this illustrative embodiment substantially encloses the entirety of the spool 78 and spring 88, and most of the strap 52 when the strap is retracted; a closed case design. In other embodiments, portions of the case 76 may be open so that portions of the spool 78 and/or portions of the spring 88 are exposed; an open case design. One of the functions of the case 76 for the embodiment is to provide a structure for retaining the spool 78, the spiral spring 88, wound up strap portions, and the brake 74. Another function of the case 76 may include protecting a person's fingers or clothing from engaging with the spool 78, spring 88, and strap 52 as the strap 52 is being wound onto the spool 78. Another function of the case 76 may include guiding the strap 52 as it is wound onto the spool 78. Another function of the case 76 may include providing a way of attaching the apparatus 70 to a quilting frame 54.

The spiral spring 88 of this exemplary embodiment is best shown in FIG. 9. The spiral spring 88 is formed from a flat strap of sprung steel material. The spiral spring 88 has a first string end 91 and a second spring end 92. As shown in FIG. 10, the first spring end 91 has a notch cut out of each side to form a recess 94 on each side and a tab 96 at the first spring end 91. The second strap end 82 is attached to the first spring end 91 using a seven inch length of hobby wire or safety wire wrapped around the second strap end 82 tightly enough to be within the recesses 94 with a smaller diameter than the end tab 96. In other embodiments, the second strap end 82 may be attached to the first spring end 91 by any of a wide variety of ways, including but not necessarily limited to being sewing with thread, the first spring end having a hole or loop formed therein, a snap, a hook and loop fastener, a rivet, a staple, a crimped metal band, a clamp, a button, adhesive, ultrasonic welding, welding, soldering, melting, bolt/nut combo, screw, a releasable clip, metal wire, or any combination thereof, for example.

Another function of the case 76 may include retaining the second string end 92 in a fixed position relative to the first spring end 91. The second spring end 92 of the example embodiment has a sharp bend in it (e.g., 90 degree bend), which extends at least partially through the slit of the central post 90. In other embodiments, the second spring end may be retained by the spool and/or by a portion of the case in other ways. Also, in other embodiments, different spring types, spring configurations, spring sizes, spring lengths, spring materials, or combinations thereof, may be implemented to provide a retracting action or spring bias upon the strap 52. It may be preferred to apply oil to the spring 88 during manufacturing to reduce wear of the spring and to prevent corrosion of the spring. In an embodiment, the spring 88 may be coated with a thin layer of a secondary material to reduce wear and/or to prevent corrosion. It is contemplated that there may be an embodiment of the invention that omits the spring 88. For example, a hand crank mechanism and/or an electric motor may be used to retract the strap 52 toward and/or into the case 76.

The spool 78 of the strap retraction mechanism 80 for this embodiment is best shown in FIGS. 8 and 9. The spool 78 may rotate relative to the case 76. The spool 78 of this embodiment provides functions including retaining the spring 88 and retaining the strap 52 when the strap is retracted. The spool 78 of FIGS. 8 and 9 has an inner drum region at least partially housing and retaining the spiral spring 88. At least part of the strap 52 is wound about an outer region of the spool 78 when the strap is partially or fully retracted into the case 76. The spool 78 includes a removable cap portion 98 for at least partially enclosing and retaining the spiral spring 88 in the inner drum region. FIG. 8 shows the cap portion 98 operationally installed. FIG. 9 shows the spool 78 with the cap portion 98 removed to expose the spiral spring 88. The spool 78 of this embodiment does not engage the central post 90, but in other embodiments, a portion of the spool may engage with the central post. The spool 78 of this embodiment is made from molded plastic. In other embodiments, the spool 78 may be made of any suitable material, including but not necessarily limited to plastic, rubber, wood, metal, polymer, fiberglass, fiber reinforced polymer, carbon fiber composite material, fiber reinforced composite material, glass, acrylic, thermoplastic material, or any combination thereof, for example. It is contemplated that there may be an embodiment of the invention that omits the spool 78, such that the spiral spring 88 is guided by portions of the case 76.

As shown in FIGS. 4-10, the case 76 includes a brake region 100 for retaining and guiding movement of the brake 74. FIGS. 11 and 12 show front and rear perspective views of the brake 74 for this embodiment. The brake 74 of this embodiment is made from a molded plastic material, but may be made from any suitable material(s) for other embodiments. The brake 74 includes a brake knob 102 that extends at least partially outside of the case 76. In this embodiment, the brake 74 is a slider mechanism that slides from an unlocked position to a locked position, and vice versa. FIG. 8 shows the brake 74 within the case 76 and the interior brake region 100 of the case 76 that guides the sliding motion of the brake 74 during movement. As shown in FIGS. 11 and 12, the brake 74 of this example embodiment includes brake teeth 104, which engage the strap 52. However, in other embodiments the brake teeth 104 may be omitted. When the brake 74 is in a locked position (when the user presses the brake knob 102 downward), the brake teeth 104 press against the strap 52, sandwiching the strap 52 between the brake teeth 104 and a brake region 100 of the case 76. When the brake 74 is in an unlocked position (when the user presses the brake knob 102 upward), the brake teeth 104 are moved upward away from the strap 52, thereby allowing clearance for the strap 52 to move in and out of the case 76. The region 106 in FIGS. 5 and 10 above the brake knob 102 when the brake 74 is locked, and/or the region 108 in FIG. 4 below the brake knob 102 when the brake 74 is unlocked, may include color(s) (e.g., red, green), word(s) (e.g., LOCKED, UNLOCKED), symbol(s) (e.g., icon resembling a locked pad lock, icon resembling an unlocked pad lock), or combinations thereof, for example, to indicate the state of the brake 74 (e.g., brake is locked, brake is unlocked). Such an indicator may aid the user in working more efficiently. Such an indicator may be applied by screen printing, ink jet printing, one or more stickers, or combinations thereof, for example.

There are many configurations of brake mechanisms, spring biasing configurations, case configurations, spool configurations, and retraction mechanisms, that are currently known, and perhaps more will be later developed, in the field of carpentry tape measures, combinations and aspects of which may be incorporated into a design of a strap retraction mechanism 80 for other embodiments of the invention. For example, the following US patents regarding tape measuring devices are hereby incorporated by reference: U.S. Pat. Nos. 1,259,886, 2,076,704, 2,536,766, 3,041,004, 3,141,628, 3,164,907, 3,521,831, 3,570,782, 3,905,114, 4,131,244, 4,153,996, 4,194,703, 4,449,302, 4,663,854, 4,972,601, 4,998,356, and 5,007,178. However, it is contemplated that an embodiment of the invention may omit the use of a brake 74 or brake mechanism. For example, the spring of an embodiment may be strong enough to provide sufficient tension on a workpiece 46 such that a brake is not needed or the use of a brake that is present is not necessary.

FIG. 13 shows a close up view of the clamp 50 and first strap end 81 of the embodiment of FIGS. 3-12. This particular clamp is described in great detail in U.S. Pat. No. 6,698,071, which is hereby incorporated by reference. The clamp 50 of FIG. 13 has a desirable feature in that it can be easily operated with one hand during opening and closing of the clamp. In an embodiment for use in longarm quilting systems, and other quilting frames, it may be preferred to have at least some of the teeth 110 of the clamp 50 at the most distal end of the clamp, a shown in FIG. 13 for example. This allows the clamp 50 to be attached to a small portion of the sheet at the lateral edge to reduce the distance that the clamp extends along the X direction toward the center of the workpiece 46 from the lateral edge. Some clamps have relatively large overhangs extending beyond the most distal clamp tooth, which may also be incorporated into an embodiment of the invention but which may be undesirable to some users or for some applications.

FIGS. 2 and 14-19B show some example clamps 50 that may be incorporated into an embodiment of the invention. FIG. 2 is discussed above. The clamp 50 of FIG. 14 has pivotably attached teeth 110. The strap 52 shown in FIG. 14 has a circular cross-section shape and is an elastic material. The clamp 50 of FIG. 15 is an example of a quilt clamp that has a large overhang extending beyond the clamp tooth 110. The clamp 50 of FIG. 16 is made from molded plastic for the jaws 112 and handle 62 of the clamp and has a non-metal spring biasing the jaws toward a closed position. The clamp jaws 112 shown in FIG. 16 include a first material forming the structural shaped of the clamp 50 (molded plastic) and a second material forming the teeth members 110 (lower tooth member shown, corresponding upper tooth member is hidden). The second material forming the teeth members 110 in this example is a silicon material. Hence, the second material of the teeth members 110 is more compliant than the first material, which aids in grabbing and holding an object (e.g., workpiece 46) during use.

The clamp 50 of FIG. 17 includes a metal spring 58 biasing the jaws toward a closed position. The handle 62 of the clamp 50 of FIG. 17 includes loops 84, either or both of which may be used for attaching a strap 52 when used in an embodiment of the invention, for example.

FIGS. 18, 19A, and 19B show yet another clamp design/type that may be incorporated into an embodiment of the invention. Except for the location where the first strap end 81 is attached to the clamp 50, the clamp 50 of FIG. 18 has a uniform cross-section along one directional extent of the clamp (along width W). This type of clamp design may be made using an extrusion process, for example. FIGS. 19A and 19B show a cross-section view of the clamp 50 of FIG. 18 as taken along the line 19-19. FIG. 19A shows the clamp 50 in an open configuration. FIG. 19B shows the clamp 50 in a closed configuration. An advantage of this type of clamp is that the clamp 50 may be relatively light weight compared to other clamp designs. For example, the clamp 50 may be made from polypropylene plastic, which is relatively inexpensive to manufacture (another advantage). An advantage of this type of clamp design is that although the clamping force per area is relatively small (which itself may be an advantageous feature), the clamp 50 grabs a relatively large area along the entire width W of the clamp. For example, the clamp 50 shown in FIG. 18 has a width W of about 8 inches, whereas many other clamp designs may only have a grabbing width of about 1 inch (thus requiring a greater clamp force per area). Another advantage of this clamp design shown in FIGS. 18-19B is that the width can be easily varied during manufacturing to allow a seller to offer a wide variety of clamp widths (e.g., 4 inch, 8 inch, 12 inch, 15 inch, 20 inch), with only minor variations in the manufacturing process.

The clamps 50 shown in FIGS. 2 and 13-19B show a wide variety of illustrative and exemplary clamps that may be incorporated into a design/configuration for an embodiment of the invention. There are many other clamp styles, clamp designs, clamp material options, and configurations that may be found for use in clamping/holding sheet material(s) (e.g., tarp, cover, blanket, sheet, clothing, chip bag, tent). Although the embodiment shown in FIGS. 3-12 uses a particular clamp 50 that has many preferred features, other clamp alternatives/features may be substituted and/or incorporated into an embodiment of the invention and there are many clamp configurations/features/designs, that are currently known, and perhaps more will be later developed, combinations and aspects of which may be incorporated into the design of a clamp 50 for a clamp apparatus embodiment of the invention. For example, the following US patents regarding clamps (e.g., for sheet materials) are hereby incorporated by reference: U.S. Pat. Nos. 7,143,48, 1,050,948, 1,299,873, 3,177, 542, 3,767,092, 3,896,527, 4,097,169, 4,534,089, 4,733,988, 4,763,390, 4,893,423, 5,046,222, 5,245,715, 5,388,313, 5,529,083, 5,579,798, 6,223,665, 6,446,567, 6,516,500, 6,698,071, 7,152,284, 7,185,402, 7,189,024, 7,243,402, 7,302,898, 7,308,739, 7,837,164, 7,871,052, 7,996,963, 8,196,272, 20050257353, 20090235497, D386215, D405808, D420800, D439202, D528903, and D645969.

Figures 20, 21:
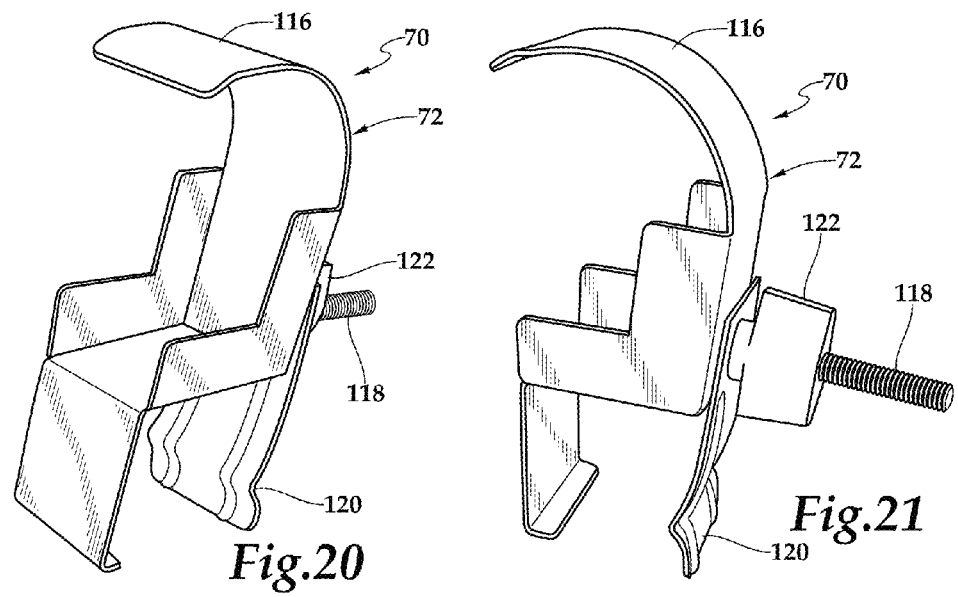
FIG. 20 is a front perspective view of a bracket of a quilt clamp apparatus of FIG. 3.
FIG. 21 is a rear perspective view of a bracket of a quilt clamp apparatus of FIG. 3.
Figure 22:
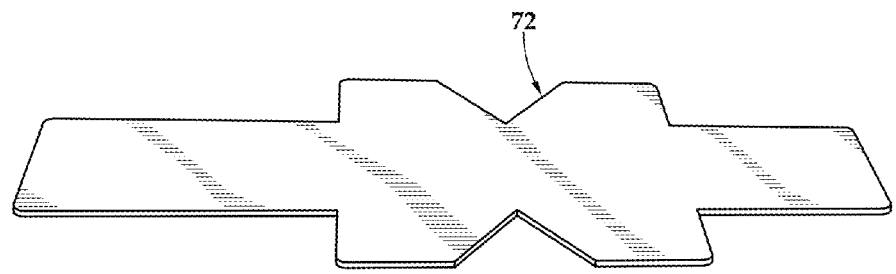
FIG. 22 is perspective view of a partially manufactured bracket of a quilt clamp apparatus of FIG. 3.

FIGS. 20 and 21 show perspective views of the bracket 72 for the embodiment of FIGS. 3-12, separated from the case 76. The bracket 72 of this illustrative embodiment includes portions made from sheet metal that has been patterned (cut), bent, and welded. FIG. 22 shows the pattern of the sheet metal after cutting and prior to bending and welding. After bending, a weld is placed on each side. In other embodiment, the welding may be omitted. The upper portion 116 of the bracket 72 is configured to be pulled up slightly to allow the case 76 to be inserted and elastically returning to a relaxed position that retains the case 76. A hole is formed in the back of the bracket 72 and a bolt 118 is inserted into the hole. In an embodiment, the bolt head may be welded to the bracket 72 to prevent the bolt 118 from rotating. In other embodiments, the bolt 118 may be prevented from rotating by other suitable means (e.g., lock nut, adhesive, recessed socket, socket extending from bracket, socket formed in or on the case). In other embodiments, the bracket 72 may have some other form of threaded shaft extending from a surface of the bracket 72. A flange portion 120 is retained by the bolt 118 and a nut 122. The nut 122 threadedly engages the bolt 118. In this embodiment, the nut 122 has an outer surface configured for tightening and loosening the nut by hand without the need for tools. In this example, the nut 122 has plastic wing portions extending from the metal threaded nut portion, so it is a type of wing nut. The threaded shaft of the bolt 118 extending through the flange hole and the nut 122, combined form an adjustable flange that may clamp to a quilting frame 54 within a selected range of widths (e.g., 1 inch to 1.5 inches). In other embodiments, the flange may be varied so that the range of widths for adjustability of the bracket 72 is a different range than that shown in FIGS. 20 and 21. The bracket 72 may be made from any suitable material(s), including but not necessarily limited to metal, wood, plastic, rubber, polymer, fiberglass, fiber reinforced polymer, carbon fiber composite material, fiber reinforced composite material, acrylic, thermoplastic material, or any combination thereof, for example.

In an embodiment, portions or the entirety of the bracket 72 may be integrally formed with part or all of the case 76. For example, in an embodiment, the case may be made from molded fiber-enforced polymer (a composite material) that has bracket portions extending from the case (e.g., integral with the case, formed while forming the case). Some embodiments have an adjustable bracket 72 configured for fitting on a variety of different quilting frames. Some embodiments may have a bracket that is not adjustable, but rather is specifically designed to fit on a certain make/model or small group of make/model quilting frames (e.g., quilting frames from a certain manufacturer). The bracket may include a second material (e.g., vinyl, silicon, rubber, latex) that is more compliant than the structural material(s) (e.g., metal, wood, plastic, composite) used to form the bracket structure. Such second material may aid in maintaining the position of the bracket by increasing the friction between the bracket and the quilting frame. An embodiment may include a hook and loop fastener to retain or assist in retaining the position of the bracket on a quilting frame. A quilting system embodiment may have the bracket or a portion of the bracket integrally formed with or permanently coupled to the quilting frame. There are many ways a bracket may attach to a quilting frame for an embodiment. For example, the bracket may be attached with some form of fastener, including but not necessarily limited to bolt/nut combo, screw, adhesive, welding, rivet, hook and loop fastener, snap, wedge fit, interference fit, zip tie, tape, or combinations thereof, for example. In another embodiment, a case may be bolted directly to a quilting frame, or the case may be directly, permanently coupled to the quilting frame (e.g., adhesive, ultrasonic welding, welding). It is contemplated that an embodiment of the invention may not have a separate or distinct bracket. For example, part of the case may be integrally formed with or permanently coupled to a portion of a quilting frame, thereby eliminating the need for a distinct bracket portion or a separable bracket.

An embodiment of the invention may be made/sold as a kit having part or all of the parts needed to completely assemble a retractable quilt clamp apparatus. For example, a kit may include a variety of clamps that are adapted to be attached or removably coupled to the first strap end. For example, a kit may exclude the clamp such that a user obtains the clamp from another source and combines it with the kit to assemble a retractable quilt clamp apparatus. And/or for example, the clamp portion may be sold separately, such that the user can select the style, size, make, and/or model of clamp desired to be combined with the kit for use of the embodiment. In such kit embodiment, the first strap end may be adapted to attach to any of a wide variety of clamps. For example, the first strap end may simple be a cut off end of the strap. Alternatively, the first strap end may include a portion of or a complete fastener (e.g., snap, clip, socket, etc.). An embodiment may be a kit that excludes the bracket or a portion of the bracket. And/or, the bracket may be sold separately. Hence, the embodiment may be configured to attach a variety of brackets. Then, the user selects a bracket for a particular style, make, and/or model of quilting frame to be combined with the kit to make use of the embodiment for a particular application.

Now having described in detail the embodiment of the invention shown in FIGS. 3-12 and 20-21, as well as illustrative variations and alternatives (and even optional omissions)

for various elements of the embodiment, a method of using the embodiment will be described with reference to FIGS. 3-12 and 20-21. Merely for discussion and context, assume that at the initial state, the strap 52 is fully retracted (most of the strap 52 is in the case 76 about the spool 78) and the clamp 50 is located at the strap retraction mechanism 80, as shown in FIG. 4. After layers of a quilt workpiece 46 are positioned and secured by the rollers 31, 32, and 33 of the quilting frame 54, the user pulls the clamp 50 of the apparatus 70 away from the strap retraction mechanism 80 toward the workpiece 46 such that part of a strap 52 of the apparatus 70 is removed from the strap retraction mechanism 80. The pulling action overcomes the spring force retaining the strap 52 in the strap retraction mechanism 80. The user attaches the clamp 50 to an edge of the workpiece 46. If needed/desired (this step may be optional, e.g., if spring's pull on the workpiece 46 is sufficient tension), the user pulls the strap 52 away from the workpiece 46 toward the strap refraction mechanism 80 to apply tension on the workpiece 46 via the clamp 50. With clamp 50 set to a desired position and the strap position set to a desired tension exerted on the workpiece 46, the user presses down on the brake knob 102 to engage the brake 74 of the strap retraction mechanism 80 to press against the strap 52. The brake knob 102 is pressed downward until the brake 74 is in a locked position, which fixes the strap 52 relative to the case 76. Hence, in this embodiment, the brake 74 clamps the strap 52 between the brake 74 and the case 76 with sufficient force to prevent the strap 52 from sliding in or out of the case 76 (i.e., up to a certain pulling force threshold that would overcome the friction of the clamping action of the brake 74). Then, the user repeats this for each of the remaining three retractable quilt clamp apparatus 70, resulting in the configuration shown in FIG. 3.

Next, to remove the clamp 50 from the workpiece 46 (e.g., so the user can move the workpiece 46 on the rollers 31, 32, 33, and 34 to a new position), the user presses the brake knob 102 upward to disengage the brake 74 from being pressed against the strap 52. This releases the clamp force that was being applied by the brake 74 against the strap 52. It also allows clearance for the strap 52 to move relative to the case 76 when in an unlocked position. Then, the user unlocks the clamp 50 and removes the clamp 50 from the workpiece 46. The user then moves the clamp 50 toward the strap retraction mechanism 80. During such movement, as the clamp 50 is moved toward the strap refraction mechanism 80, the spring 88 which is biasing the strap 52 to be wound onto the spool 78 retracts the slack in the strap 52 and begins to wind the strap 52 onto the spool 78 inside the case 76. When the clamp 50 is at the case 76, most of the strap 52 has then been wound onto the spool 78 inside the case 76 by the biasing force of the spring 88. Hence, the strap 52 is never in the way or sagging or touching the ground during the use. The spring 88 has sufficient biasing force to sustain the weight of the clamp 50 and retain the clamp 50 at the strap retraction mechanism 80, as shown in FIG. 4. Hence, the clamp 50 is retained, out of the way, and not laying on the floor and the user is not concerned about misplacing it or knocking it off the quilting frame 54 while moving the workpiece 46. In a variation on the removal process, the user may release the clamp 50 with one hand while unlocking the brake 74 with the other hand. Thus, an embodiment may provide a fast and efficient removal process that can speed up the quilting processing and reduce the effort of the user. An advantage of this embodiment is that the clamp 50 can be operated with one hand, and the brake 74 can be operated with one hand, without the need for great strength. In another variation on the removal process, the user may remove the clamp 50 from the workpiece 46 first and them unlock the brake 74 (e.g., retaining the clamp 50 in hand while unlocking the brake 74). Another advantage of this embodiment is that a user can remove and attach the clamp 50 with only one hand and the strap 52 is automatically controlled at all times by the strap retraction mechanism 80. This may provide enhanced accessibility to quilting for a person with an injury or disability having only functional use of one hand. In another variation on the removal process, the user may unlock the brake 74, then remove the clamp 50 from the workpiece 46, and release the clamp 50 allowing the strap retraction mechanism 80 to pull the strap 52 and clamp 50 toward the case 76, but this method is obviously less preferred because the clamp 50 may bounce around and hit something or someone. But, the point here is that if the user drops the clamp 50 by accident, the strap retraction mechanism 80 will retrieve it. This could be very useful for a user that has health issues and is unable to bend over or pick things up from the floor. The clamp 50 and strap 52 are maintained at the workpiece level and do not fall to the floor (or if the clamp does fall to the floor, it can be retrieved without bending over). Hence, the automatic retraction of the strap 52 and the automatic retrieval of the clamp 50 are advantages of this embodiment of the invention. Another advantage is that the strap 52 is retained and controlled at all times without extra effort by the user to wrangle with the strap 52. Many users will find this quite pleasing in comparison to using prior available clamp strap configurations.

Figure 23:
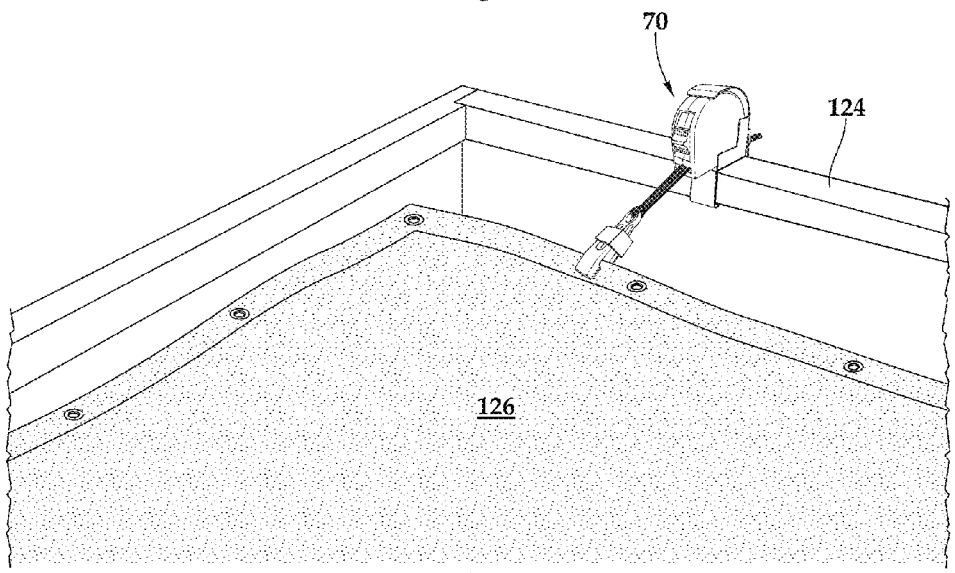
FIG. 23 is perspective view of a retractable clamp apparatus embodiment of the invention being used on a pickup truck bed to retain a tarp.

An embodiment of the invention may have other uses and applications beyond quilting. For example, an embodiment of the invention may be an embroidery system, and/or a retractable clamp apparatus embodiment 70 of the invention may be used on or with an embroidery system. For example, an embodiment of the invention may be used to retain clothing, to retain a cover, to retain a blanket, or to retain a tarp. FIG. 23 is perspective view of a retractable clamp apparatus embodiment 70 being used on a pickup truck bed 124 to retain a tarp 126. Any number of the apparatus 70 may be placed at various locations about the truck bed 124, for example, to provide a fast and easy way to cover and uncover objects within the truck bed 124 and/or to prevent the tarp 126 from blowing away. This could be very useful at a job site for example, when a contractor needs to quickly and frequently access tools from the truck bed 124, but does not want to leave the tools exposed (e.g., to prying eyes, to thieves, to the sun, to rain, to snow).

Figure 24:
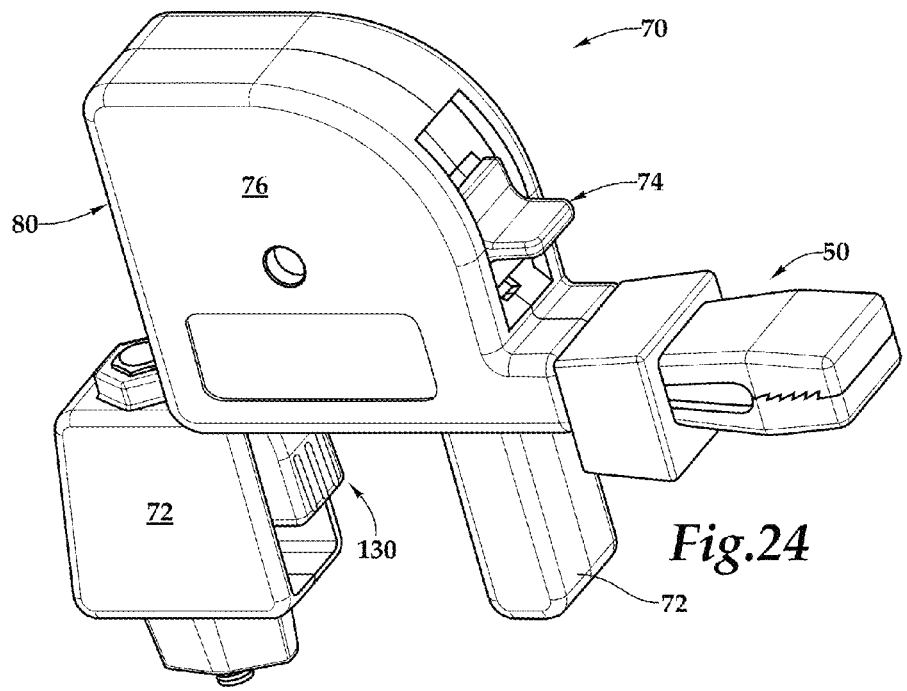
FIGS. 24 and 25 are perspective views of a retractable clamp apparatus embodiment of the invention.
Figure 25:
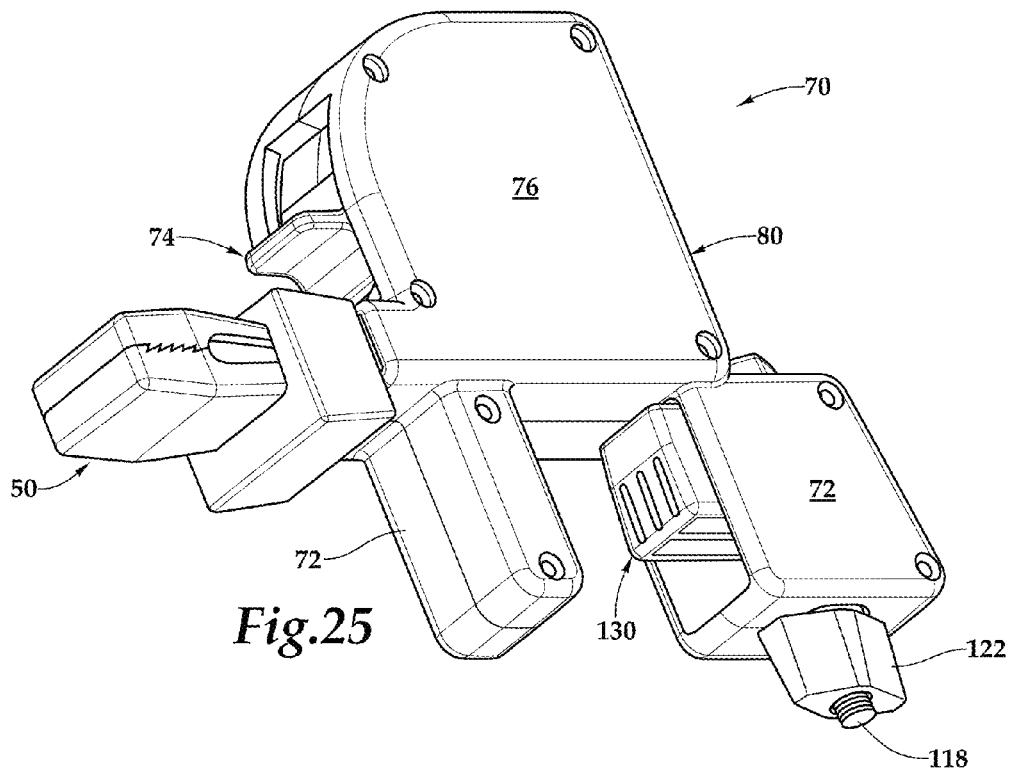

FIGS. 24-35 illustrate another retractable clamp apparatus embodiment 70 of the present invention. More specifically, FIGS. 24 and 25 are perspective views of the assembled retractable clamp apparatus embodiment 70. FIGS. 26 and 27 are perspective views of the left half of the case 76 for the retractable clamp apparatus 70 of FIGS. 24 and 25. FIGS. 28 and 29 are perspective views of the right half of the case 76 for the retractable clamp apparatus 70 of FIGS. 24 and 25. FIGS. 26-29 show that the case 76 may be manufactured using injection molding (e.g., resin, thermoplastic, etc.), for example. In another embodiment, the case 76 may be formed from cast metal, for example.

FIG. 30 is a front perspective view of a brake 74 from the retractable clamp apparatus 70 of FIGS. 24 and 25. FIG. 31 is a rear perspective view of a brake 74 from the retractable clamp apparatus 70 of FIGS. 24 and 25. The brake 74 of this embodiment has a larger brake knob 102 to improve the ease of use and ergonomics of the apparatus. The brake 74 of this embodiment has four brake teeth 104 with sharp edges for improved gripping of the strap 52 during use. FIGS. 30-31 show that the brake 74 may be manufactured using injection molding (e.g., resin, thermoplastic, etc.), for example. In another embodiment, the brake 74 may be formed from cast metal, for example.

FIG. 32 is a perspective view of a spool 78 from the retractable clamp apparatus 70 of FIGS. 24 and 25. FIG. 32 shows that the spool 78 may be manufactured using injection molding (e.g., resin, thermoplastic, etc.), for example. In another embodiment, the spool 78 may be formed from cast metal, for example.

As shown in FIGS. 24-25 and 33-35, the retractable clamp apparatus 70 of this embodiment provides interchangeable bracket members 130 so the clamp apparatus 70 may be adapted to fit a range of different quilting frames of various sizes (e.g., ½ inch, ⅝ inch, 1 inch, 1.5 inch, metric, etc.) and various shapes (rectangular, square, rounded, tubular, circular, etc.). Hence, by substituting one bracket member 130 for another bracket member 130 of a different size and/or shape, the apparatus 70 may be adapted to fit another quilting machine system (e.g., different size, different manufacturer, different style). This provides an advantage of greater versatility and universal fit so that a same retractable clamp apparatus 70 may be used for a wide variety of applications.

FIG. 33 is a top perspective view of a bracket member 130 for the retractable clamp apparatus 70 of FIGS. 24 and 25, adapted for use with ⅝ inch square frame tubing, for example. FIG. 34 is a top perspective view of a bracket member 130 for the retractable clamp apparatus 70 of FIGS. 24 and 25, adapted for use with 1.5 inch square frame tubing, for example. FIG. 35 is a bottom perspective view of the bracket member 130 of FIG. 34, which shows that the bracket member 130 may be manufactured using injection molding, for example. In a preferred embodiment, the bracket member 130 is made from a unitary piece of compliant material, for example. As shown in FIGS. 33-35, the bracket member 130 may have an elongated hole 131 so that the bracket member 130 may be more finely adjusted during fitment to another object (e.g., when attaching to a quilting machine frame for a system).

Although embodiments of the invention and at least some of its advantages have been described in this disclosure, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps, presently existing or later to be developed, that perform substantially the same function or achieve substantially the same result as the corresponding embodiments described herein may be utilized according to the invention. Accordingly, the appended claims are intended to include within their scope such processes, machines, manufacture, compositions of matter, means, methods, or steps. In general, in the following claims, the terms used should not be construed to limit the claims to the specific embodiments disclosed in the specification, but should be construed to include all possible embodiments along with the full scope of equivalents to which such claims are entitled.

What is claimed is:

1. A quilt clamp apparatus comprising:
a clamp configured for grabbing and releasably holding a sheet during use of the apparatus;
a strap including a first strap end and a second strap end, the first strap end being attached to the clamp;
a strap retraction mechanism including a case, a spool, a spiral spring, and a brake,
the case includes a first case half attached to a second case half, the case at least partially housing and retaining the spool, the first case half having a central case post extending therefrom and at least partially within the spool, the central case post having a slit formed therein,
the spiral spring having a first spring end and a second spring end,
the second strap end being attached to the first spring end,
the second spring end extending at least partially through the slit of the central case post to retain the second spring end,
the spool having an inner drum region at least partially housing and retaining the spiral spring,
at least part of the strap being wound about an outer region of the spool when at least part of the strap is retracted into the case,
the case includes a brake region for retaining and guiding movement of the brake, and
the brake being configured to press against the strap when in a locked position and being configured to allow clearance for the strap to move in and out of the case when in an unlocked position; and
an adjustable bracket configured for attachment to a quilting frame during use of the apparatus, wherein at least part of the adjustable bracket is an integral part of at least one portion of the case.

2. The quilt clamp apparatus of claim 1, wherein the clamp includes jaws with teeth at a distal end of the clamp.

3. The quilt clamp apparatus of claim 1, wherein the clamp includes a loop for attaching the first strap end.

4. The quilt clamp apparatus of claim 1, wherein the clamp is adapted for one-handed operation.

5. The quilt clamp apparatus of claim 1, wherein the strap includes a flat webbing material.

6. The quilt clamp apparatus of claim 1, wherein the strap includes a vinyl coated steel cable.

7. The quilt clamp apparatus of claim 1, wherein the strap includes a monofilament line made from synthetic fiber.

8. The quilt clamp apparatus of claim 1, wherein the strap includes at least one material selected from the group consisting of nylon, polyester, polypropylene, carbon fiber, aramid fiber, leather, cotton, silk, hemp, linen, steel, titanium, copper, aluminum, and vinyl.

9. The quilt clamp apparatus of claim 1, wherein at least part of the spiral spring is made from a steel material.

10. The quilt clamp apparatus of claim 1, wherein the spool includes a cap portion for at least partially enclosing and retaining the spiral spring in the inner drum region.

11. The quilt clamp apparatus of claim 1, wherein the brake includes a brake knob extending at least partially outside of the case.

12. The quilt clamp apparatus of claim 1, wherein at least part of the brake is a slider mechanism.

13. The quilt clamp apparatus of claim 1, wherein the adjustable bracket includes a threaded shaft and a nut, the nut including an outer surface configured for tightening and loosening the nut by hand without the need for tools.

14. A quilt clamp apparatus comprising:
a clamp configured for grabbing and releasably holding a sheet during use of the apparatus;
a strap including a first strap end and a second strap end, the first strap end being attached to the damp;

a strap retraction mechanism including a case, a spool, a spiral spring, and a brake, the case includes a first case half attached to a second case half, the case at least partially housing and retaining the spool, the first case half having a central case post extending therefrom and at least partially within the spool, the central case post having a slit formed therein, the spiral spring having a first spring end and a second spring end, the second strap end being attached to the first spring end, the second spring end extending at least partially through the slit of the central case post to retain the second spring end, the spool having an inner drum region at least partially housing and retaining the spiral spring, at least part of the strap being wound about an outer region of the spool when at least part of the strap is retracted into the case, the case includes a brake region for retaining and guiding movement of the brake, and the brake being configured to press against the strap when in a locked position and being configured to allow clearance for the strap to move in and out of the case when in an unlocked position; and an adjustable bracket configured for attachment to a quilting frame during use of the apparatus, wherein at least part of the adjustable bracket is separable from the case.

15. A quilt clamp apparatus comprising:

a clamp having jaws configured for holding a sheet during use;

a strap having a first strap end and a second strap end, the first strap end being attached to the clamp;

a strap retraction mechanism attached to the second strap end, the strap retraction mechanism having a case and being configured to retract and retain at least part of the strap during use; and a bracket configured to attach the apparatus to another object during use, wherein at least part of the bracket is an integral part of the case of the strap retraction mechanism.

16. The quilt clamp apparatus of claim 15, wherein the strap retraction mechanism includes a spool, a spiral spring, and a brake, the case at least partially housing and retaining the spool, the spiral spring having a first spring end and a second spring end, the second strap end being attached to the first spring end, the second spring end being retained within an inner region of the spool, the inner region of the spool at least partially housing and retaining the spiral spring, at least part of the strap being wound about an outer region of the spool when at least part of the strap is retracted into the case, the case includes a brake region for retaining and guiding movement of the brake, and the brake being configured to press against the strap when in a locked position and being configured to allow clearance for the strap to move relative to the case when in an unlocked position.

17. A quilting system comprising:

a quilting frame; and a quilt clamp apparatus configured to attach to the quilting frame, the quilt clamp apparatus including a clamp, a strap, a strap retraction mechanism, and a bracket, the clamp having jaws configured for holding a sheet during use, the strap having a first strap end and a second strap end, the first strap end being attached to the clamp, the strap retraction mechanism being attached to the second strap end, the strap retraction mechanism including a spring and being configured to retract and retain at least part of the strap using spring bias from the spring during use, and the bracket being configured for attaching the strap retraction mechanism to the quilting frame.

18. The quilting system of claim 17, further comprising a sewing machine movably coupled to the quilting frame.

19. A method of using a retractable quilt clamp apparatus, comprising:

pulling a clamp of the apparatus away from a strap retraction mechanism of the apparatus toward a workpiece such that part of a strap of the apparatus is removed from the strap retraction mechanism, the clamp being coupled to the strap retraction mechanism via the strap, wherein the workpiece is held by a quilting frame;

attaching the clamp to an edge of the workpiece; and pulling the strap away from the workpiece toward the strap retraction mechanism using a spring bias of the strap retraction mechanism to apply tension on the workpiece via the clamp.

20. The method of claim 19, further comprising:

engaging a brake mechanism of the strap retraction mechanism to press against the strap to fix the strap relative to the strap retraction mechanism.

21. The method of claim 20, further comprising:

disengaging the brake mechanism from being pressed against the strap;

detaching the clamp from the workpiece;

retracting the strap and clamp toward the strap retraction mechanism; and retaining the strap at and by the strap retraction mechanism while the clamp is located at the strap retraction mechanism.

* * * * *